United States Patent
Hong

(10) Patent No.: US 10,278,126 B2
(45) Date of Patent: Apr. 30, 2019

(54) METHOD FOR ACTIVATING OR DEACTIVATING SMALL CELL AND APPARATUS THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 85 days.

(21) Appl. No.: 14/765,904

(22) PCT Filed: Feb. 5, 2014

(86) PCT No.: PCT/KR2014/000996
§ 371 (c)(1),
(2) Date: Aug. 5, 2015

(87) PCT Pub. No.: WO2014/126356
PCT Pub. Date: Aug. 21, 2014

(65) Prior Publication Data
US 2015/0373559 A1    Dec. 24, 2015

(30) Foreign Application Priority Data

Feb. 13, 2013 (KR) .......................... 10-2013-0015384
Oct. 30, 2013 (KR) .......................... 10-2013-0129872
Dec. 4, 2013 (KR) .......................... 10-2013-0149687

(51) Int. Cl.
*H04W 52/02* (2009.01)
*H04W 92/20* (2009.01)
*H04L 5/00* (2006.01)

(52) U.S. Cl.
CPC ....... *H04W 52/0206* (2013.01); *H04L 5/0098* (2013.01); *H04W 92/20* (2013.01);
(Continued)

(58) Field of Classification Search
CPC ....................................................... H04W 76/00
(Continued)

(56) References Cited

U.S. PATENT DOCUMENTS 9,426,840 B2 *   8/2016   Chang ................... H04W 76/28
9,439,233 B2 *   9/2016   Kwon .................... H04W 76/38
(Continued)

FOREIGN PATENT DOCUMENTS

KR   10-2011-0041768 A    4/2011
KR   10-2011-0102936 A    9/2011
(Continued)

OTHER PUBLICATIONS

Imran Ashraf et al., "SLEEP Mode Techniques for Small Cell Deployments", IEEE Communications Magazine, Aug. 2011, pp. 72-79.

(Continued)

*Primary Examiner* — Edan Orgad
*Assistant Examiner* — Emmanuel K Maglo
(74) *Attorney, Agent, or Firm* — IP Legal Services, LLC

(57) ABSTRACT

The present invention relates to a method for activating or deactivating a cell associated with a second base station additionally installed as a secondary cell for user equipment and an apparatus using the same. More specifically, a method for activating and deactivating, by a user equipment, a cell associated with a second base station includes receiving an upper layer signaling through a first base station after a signaling between the first base station and the second base station, activating a particular cell associated with the second base station, and configuring a radio bearer through the second base station.

9 Claims, 19 Drawing Sheets

(52) U.S. Cl.
CPC ........ *Y02D 70/122* (2018.01); *Y02D 70/1262* (2018.01); *Y02D 70/1264* (2018.01)

(58) Field of Classification Search
USPC .......................................................... 370/329
See application file for complete search history.

(56) References Cited

U.S. PATENT DOCUMENTS

| | | | |
|---|---|---|---|
| 2006/0039326 A1* | 2/2006 | Jeong | H04W 36/0055 370/329 |
| 2010/0169498 A1 | 7/2010 | Palanki et al. | |
| 2011/0092234 A1 | 4/2011 | Kim et al. | |
| 2011/0105107 A1* | 5/2011 | Kwon | H04W 28/06 455/422.1 |
| 2011/0134774 A1* | 6/2011 | Pelletier | H04W 52/365 370/252 |
| 2011/0170411 A1 | 7/2011 | Wang et al. | |
| 2011/0243108 A1 | 10/2011 | Park et al. | |
| 2011/0244870 A1 | 10/2011 | Lee | |
| 2011/0312316 A1* | 12/2011 | Baldemair | H04L 5/001 455/422.1 |
| 2012/0140689 A1* | 6/2012 | Pelletier | H04L 5/0005 370/311 |
| 2012/0207089 A1* | 8/2012 | Kone | H04L 5/001 370/328 |
| 2012/0281548 A1* | 11/2012 | Lin | H04W 76/18 370/242 |
| 2012/0315890 A1* | 12/2012 | Suzuki | H04W 24/10 455/422.1 |
| 2013/0150044 A1* | 6/2013 | Zhang | H04W 52/0258 455/436 |
| 2013/0188473 A1* | 7/2013 | Dinan | H04W 56/0005 370/216 |
| 2013/0188612 A1* | 7/2013 | Dinan | H04W 56/0005 370/336 |
| 2013/0188619 A1* | 7/2013 | Dinan | H04W 56/0005 370/336 |
| 2013/0223321 A1 | 8/2013 | Lee et al. | |
| 2014/0056243 A1* | 2/2014 | Pelletier | H04W 74/04 370/329 |
| 2014/0086127 A1* | 3/2014 | Kim | H04L 5/001 370/311 |
| 2014/0092825 A1* | 4/2014 | Bostrom | H04W 72/048 370/329 |
| 2014/0171091 A1* | 6/2014 | Cai | H04W 76/15 455/450 |
| 2014/0247796 A1* | 9/2014 | Ouchi | H04L 5/0053 370/329 |
| 2014/0293896 A1* | 10/2014 | Kuo | H04W 72/0413 370/329 |
| 2014/0295909 A1* | 10/2014 | Ouchi | H04W 52/242 455/522 |
| 2015/0029955 A1* | 1/2015 | Heo | H04W 76/02 370/329 |
| 2015/0078261 A1* | 3/2015 | Yu | H04W 72/0453 370/329 |
| 2015/0092707 A1* | 4/2015 | Kwon | H04W 76/025 370/329 |
| 2015/0103771 A1* | 4/2015 | Kim | H04W 56/0005 370/329 |
| 2015/0223052 A1* | 8/2015 | Rosa | H04L 5/001 455/419 |
| 2015/0230112 A1* | 8/2015 | Siomina | G01S 5/0205 370/252 |
| 2015/0256305 A1* | 9/2015 | Yerramalli | H04W 76/38 370/311 |
| 2015/0264631 A1* | 9/2015 | Zhang | H04W 48/08 370/329 |
| 2016/0278073 A1* | 9/2016 | Dinan | H04W 48/08 |

FOREIGN PATENT DOCUMENTS

| | | |
|---|---|---|
| KR | 10-2011-0111374 A | 10/2011 |
| KR | 10-2012-0023514 A | 3/2012 |
| KR | 10-2012-0038504 A | 4/2012 |
| KR | 10-2012-0136481 A | 12/2012 |

OTHER PUBLICATIONS

V. Srinivasa Rao et al., "Interoperable UE Handovers in LTE", Radisys Corporation, Sep. 2011, 1-11, OR, USA.

* cited by examiner

FIG.3
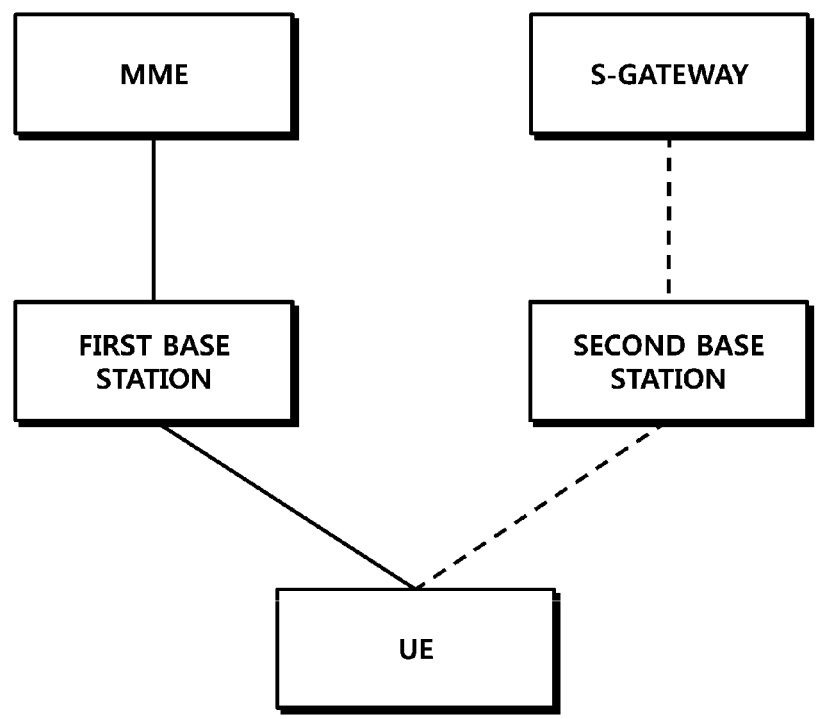
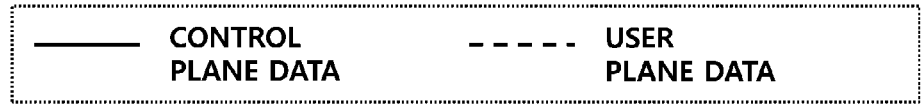

METHOD FOR ACTIVATING OR DEACTIVATING SMALL CELL AND APPARATUS THEREFOR

CROSS REFERENCE TO RELATED APPLICATIONS

This application is a National Stage Patent Application of PCT International Patent Application No. PCT/KR2014/000996 (filed on Feb. 5, 2014) under 35 U.S.C. § 371, which claims priority to Korean Patent Application Nos. 10-2013-0015384 (filed on Feb. 13, 2013), 10-2013-0129872 (filed on Oct. 30, 2013), and 10-2013-0149687 (filed on Dec. 4, 2013), the teachings of which are incorporated herein in their entireties by reference.

TECHNICAL FIELD

The present invention relates to a method of activating or deactivating a small cell associated with a Base Station (BS) added as a secondary cell.

BACKGROUND ART

As communication systems have developed various wireless terminals have been utilized by consumers, such as companies and individuals.

Current mobile communication systems affiliated with 3GPP, for example, Long Term Evolution (LTE), LTE-Advanced (LTE-A), and the like, requires a high speed and capacity communication system capable of transmitting and receiving various data, such as image and music data, program data, wireless data, and the like, beyond providing a sound-based service.

Accordingly, there is a need for a technology that extends the capacity of a User Equipment (UE) by utilizing a small cell for the high speed and high capacity communication system.

In an environment where a macro cell Base Station (BS) is connected with a small cell BS through a non-ideal backhaul, and when a UE transmits user plane data through a small cell, a radio bearer is required through the small cell and the small cell BS.

That is, when a BS that provides a macro cell and a BS that provides a small cell are different, the UE may require a method of executing communication using the macro cell and the small cell.

Also, when the UE executes data communication using an added small cell, the UE may need a method of controlling activation or deactivation of the added small cell based on data traffic, power capacity, and the like.

DETAILED DESCRIPTION OF THE INVENTION

Technical Problem

In response to the above mentioned demands, the present invention proposes a method and apparatus for a User Equipment (UE) to add a small cell associated with a Base Station (BS) that is distinguished from a macro cell BS, as a secondary cell, and to activate or deactivate the added small cell.

Also, the present invention provides a method and apparatus for a master BS that provides a macro cell or a secondary BS that provides a small cell to control activation or deactivation of a small cell added for a UE based on data traffic of the UE, power capacity, and the like.

Technical Solution

According to embodiments of the present disclosure, a method for a User Equipment (UE) to activate or deactivate a cell associated with a Base Station (BS) is provided. The method includes receiving a higher layer signaling received through a first BS, after signaling between the first BS and a second BS, configuring a predetermined cell associated with the second BS to be activated, and configuring a radio bearer through the second BS.

According to embodiments of the present disclosure, a method for a first Base Station (BS) to activate or deactivate a cell associated with a second BS is also provided. The method includes transmitting, to a User Equipment (UE), a higher layer signaling including second BS-associated cell addition/modification configuration information and second BS radio bearer addition/modification configuration information after signaling between the first BS and the second BS, and receiving by the first BS activated or deactivated state information of a cell associated with the second BS.

According to embodiments of the present disclosure, a method for a second Base Station (BS) to activate or deactivate a cell associated with the second BS is also provided. The method includes generating a higher layer signaling to be transmitted to a User Equipment (UE) through a first BS in a signaling process between the first BS and the second BS. Transmitting to the UE activation-related indication information including information indicating activation or deactivation of a cell that is different than a predetermined cell configured to be activated from among cells associated with the second BS to a cell associated with the second BS. The method also includes transmitting to the first BS activated or deactivated state information of a cell associated with the second BS.

According to embodiments of the present disclosure, a User Equipment (UE) for activating or deactivating a cell associated with a second Base Station (BS) is provided. The UE includes a receiving unit and a controller. The receiving unit is configured to receive a higher layer signaling that is received through a first BS after signaling between the first BS and the second BS. The controller is configured to form a predetermined cell associated with the second BS to be activated and to configure a radio bearer through the second BS.

According to embodiments of the present disclosure, a first Base Station (BS) that activates or deactivates a cell associated with a second BS also is provided. The BS includes a controller configured to generate a higher layer signaling including second BS-associated cell addition/modification configuration information and second BS radio bearer addition/modification configuration information after signaling between the first BS and the second BS. A transmitting unit to transmit the higher layer signaling to a User Equipment (UE). The BS further includes a receiving unit configured to receive activated or deactivated state information of a cell associated with the second BS.

According to embodiments of the present disclosure, a second Base Station (BS) that activates or deactivates a cell associated with the second BS is provided. The second BS includes a controller configured to generate a higher layer signaling to be transmitted to a User Equipment (UE) through the first BS in a signaling process between a first BS and the second BS. The second BS further includes A transmitting unit configured to transmit to the UE activation-related indication information including information indicating activation or deactivation of a cell different than a predetermined cell configured to be activated from among cells associated with the second BS through a cell associated with the second BS. The transmitting unit transmits to the first BS activated or deactivated state information of a cell associated with the second BS.

Advantageous Effects

In the present invention there is provided a method and system for a User Equipment (UE) to add, as a secondary cell, a small cell associated with a Base Station (BS) that is distinguished from a macrocell BS, and to activate or deactivate the added small cell.

Also, the present invention provides a method and system for a first BS that provides a macro cell or a second BS that provides a small cell to control activation or deactivation of a small cell added for a UE, and thus, the power consumption of the UE may be reduced, and a method and system for activating or deactivating a small cell appropriate for data traffic may be provided.

BRIEF DESCRIPTION OF THE DRAWINGS

FIG. 3 is a diagram illustrating an example of transmitting user data through a second BS to which the present invention is applied.

MODE FOR CARRYING OUT THE INVENTION

Figure 1:
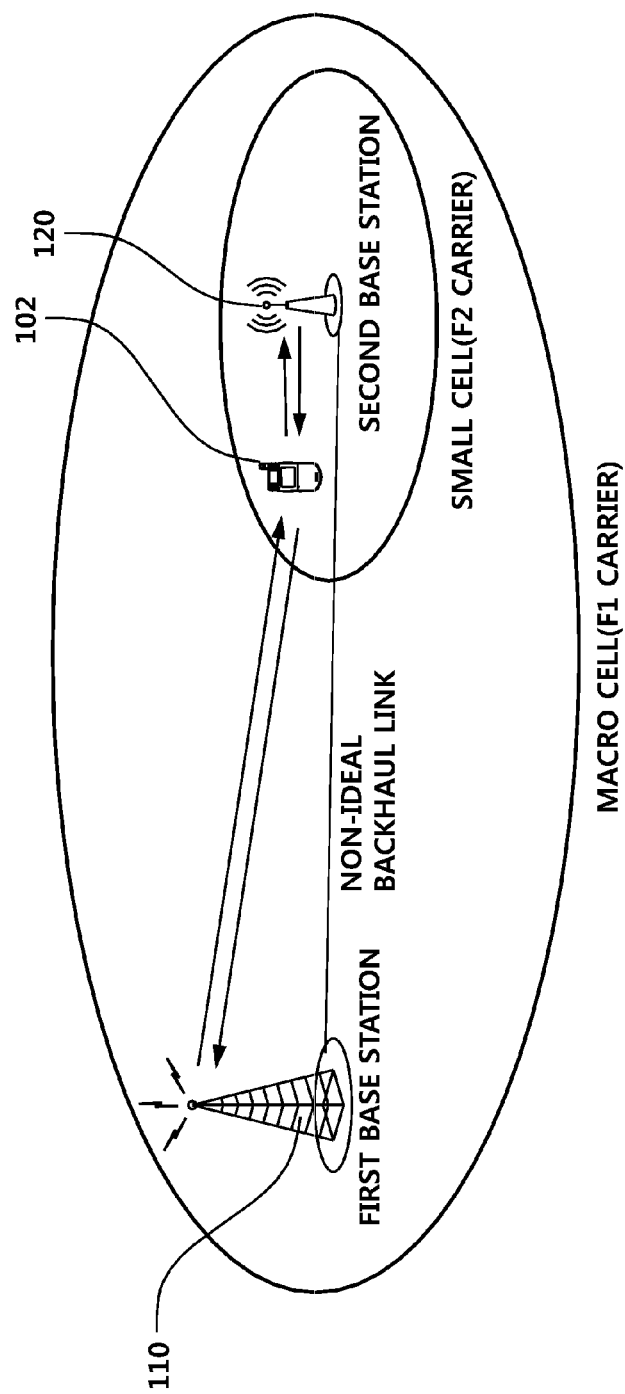
FIG. 1 is a diagram illustrating an example of a network configuration scenario to which the present invention is applied.

Hereinafter, embodiments of the present invention will be described with reference to the exemplary drawings. In attaching reference signs and numerals to elements in each drawing, it should be noted that the same elements may be designated by the same reference numerals although they are shown in different drawings. Further, in the following description of the present invention, a detailed description of known functions and configurations incorporated herein may be omitted for brevity.

In the present invention the wireless communication system may be widely deployed so as to provide various communication services, such as voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

A base station or a cell may generally refer to a station where communication with a User Equipment (UE) is performed, and may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specifications, the UE and the BS are used as two inclusive transceiving subjects (Uplink and Downlink) to embody the technology and technical concepts described in the specifications, and should not be limited to a predetermined term or word. Here, Uplink (UL) refers to a scheme for a UE to transmit and receive data to/from a BS, and Downlink (DL) refers to a scheme for a BS to transmit and receive data to/from a UE.

Multiple access schemes may be unrestrictedly applied to the wireless communication system. The wireless communication system may utilize different multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, which are LTE and LTE-advanced. Embodiments may also be applicable to resource allocation in a synchronous wireless communication scheme that is advanced through CDMA and CDMA-2000, which is UMB. The present invention is not limited to a specific wireless communication field, and may include all technical fields to which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-Advanced, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), and the like, and may be configured as a data channel, such as a PDSCH (Physical Downlink Shared CHannel), a PUSCH (Physical Uplink Shared CHannel), and the like, so as to transmit data.

In the present specification a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wiredly controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, the situation in which a signal is transmitted and received through a PUCCH, a PUSCH, a PDCCH, a PDSCH, and the like may be described through the expression, "a PUCCH, a PUSCH, a PDCCH, or a PDSCH is transmitted or received".

An eNB executes downlink transmission to UEs. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

A small cell scenario is considered where it uses a low-power node to cope with a sharp rise in mobile traffic. The low power node indicates a node that uses a lower transmission power than a general macro node.

In the Carrier Aggregation (CA) technology prior to 3GPP Release 11 configures a small cell using a low power Remote Radio Head (RRH), which corresponds to antennas geographically distributed within a macro cell coverage.

However, to apply the CA technology, a macro cell and an RRH cell are configured and scheduled under a control of a single BS. To this end, an ideal backhaul needs to be established between the macro cell BS and the RRH node. The ideal backhaul indicates a backhaul that shows a significantly high throughput and a significantly low delay, for example, a dedicated point-to-point connection that uses an optical fiber and Line Of Sight (LOS) microwave. Unlike the above, a backhaul that shows a relatively low throughput and a relatively high delay, such as an xDSL (Digital Subscriber Line) and Non-LOS microwave, is referred to as a non-ideal backhaul.

Through the above described CA technology, a plurality of serving cells may be aggregated and operate to provide services to a User Equipment (UE). That is, a plurality of serving cells may be configured with respect to a UE in a Radio Resource Control (RRC) connected-state, and when an ideal backhaul is established between the macro cell node and the RRH, the macro cell and the RRH cell are configured as serving cells and provide services to the UE.

When the above described CA technology is configured, the UE may only have a single RRC connection with a network.

In RRC connection establishment/re-establishment/handover, a single serving cell may provide NAS mobility information (for example, Tracking Area Identity (TAI). Also, in RRC connection re-establishment/handover, a single serving cell provides a security input.

The cell is referred to as a primary cell (hereinafter referred to as a 'PCell'). The PCell may be changed through only a handover procedure.

Depending on capabilities of UEs, secondary cells (hereinafter referred to as 'SCell') may be configured as serving cells together with a PCell. Addition and removal of SCells may be executed by an RRC.

For example, when a new SCell is added, a dedicated higher layer signaling (RRC signaling) may be used for transmission of all required system information of the SCell. That is, in a connected mode, a UE may not need to obtain system information directly broadcasted from SCells.

A single BS that processes a PCell and SCells may have different carriers (DL/UL PCC: Downlink/Uplink Primary Component Carrier, DL/UL SCC: Downlink/Uplink Secondary Component Carrier) in a physical layer. Therefore, a characteristic of a multi-carrier of a physical layer may affect only a Medium Access Control (MAC) layer that has a single Hybrid Automatic Repeat (HARQ) entity required for each serving cell. With respect to layers (Radio Link Control (RLC)/Packet Data Convergence Protocol (PDCP)) beyond the layer, the characteristic may not affect the RLC/PDCP layer before the CA technology is introduced. That is, the CA operation may not be identified in the RLC/PDCP layer.

Also, to use DL Component Carriers and UL Component Carriers of the SCells, added SCells must be activated. That is, for efficient battery consumption, an activation operation that is separate from an SCell addition operation for configuring SCells may be required.

Activation and deactivation of SCells may be executed through a Medium Access Control (MAC) signaling. When SCells are deactivated, a UE may not receive a PDCCH or a PDSCH, may not execute a transmission in a corresponding uplink, and may not measure a Channel Quality Indication (CQI). Conversely, when SCells are activated, a PDCCH or a PDSCH needs to be received and measurement of a Channel Quality Indication (CQI) is expected.

As described above, to establish a small cell using the CA technology in the conventional mobile communication network, a macro cell and a small cell must be scheduled under a single BS. To this end, there is a drawback in that an ideal backhaul must be established between the macro cell node and the small cell node.

Therefore, when the small cell BS is connected with the macro cell BS through a non-ideal backhaul, data is not transmitted through the small cell BS under a control of the macro cell BS (or through cooperation between the small cell BS and the macro cell BS), which is a limitation.

To overcome the limitations, the present invention provides a method of activating or deactivating a small cell when user data is transmitted by adding a small cell under a control of a macro cell in an environment where a non-ideal backhaul is established between the macro cell BS and the small cell BS in a mobile communication network.

In the present invention, when a UE configures a dual connectivity, a BS that forms an RRC connection with the UE and provides a PCell that is a reference of a handover, or a BS that terminates S1-MME and acts as a mobility anchor with respect to a core network, will be described as a master BS or a first BS.

The master BS or first BS may be a BS that provides a macro cell, and may be a BS that provides any one small cell in the situation of dual connectivity with the small cell.

A BS that provides an additional radio resource to a UE, which is distinguished from a master BS, in a dual connectivity environment, may be described as a secondary BS or a second BS.

Each of the first BS (master BS) and the second BS (secondary BS) may provide at least one cell to each UE, and the first BS and the second BS may be connected through an interface between them.

For clarity, a cell associated with the first BS may be described as a macro cell, and a cell associated with the second BS may be described as a small cell. However, in the small cell cluster scenario provided below, a cell associated with the first BS may also be described as a small cell.

In the present invention, a macro cell may indicate each of at least one cell or may indicate overall cells associated with the first BS. Also, a small cell may also indicate each of at least one cell and may indicate overall cells associated with the second BS. However, as described above, in a predetermined scenario such as the small cell cluster, this may be a cell associated with the first cell. In this instance, a cell of the second BS may be described as another small cell or still another small cell.

FIG. 1 is a diagram illustrating an example of a network configuration scenario to which the present invention may be applied.

Referring to FIG. 1, a User Equipment (UE) 102 is located within coverage of a macro cell and a small cell. That is, the UE 102 may be simultaneously located in the small cell coverage that overlaps (overlays) the macro cell coverage. The macro cell and the small cell have different carrier frequencies and a non-ideal backhaul may be established between a first Base Station (BS) 110 and a second BS 120.

In FIG. 1, the macro cell and the small cell may be established through different BSs, and an interface may exist between the first BS and the second BS (for example, Xn interface).

In FIG. 1, the UE 102 may transmit and receive data through the first BS 110 and/or second BS 120.

For example, in FIG. 1, the UE 102 may transmit data through only the second BS 120. That is, the second BS 120 operates as a stand-alone BS, and may establish a single RRC connection with the UE 102. The UE 102 may transmit control plane data through the RRC connection. Also, at least one or more Signaling Radio Bearers (SRBs) may be configured. To transmit user plane data, the UE 102 may have one or more DRBs (Data Radio Bearers), with the second BS 120.

In another example in FIG. 1, the UE 102 may transmit user plane data through the second BS 120 under a control of the first BS 110 (or cooperation between the first BS and the second BS).

Specifically, the UE 102 may establish a single RRC connection with the first BS 110 for control plane data transmission. Also, the UE 102 may establish one or more SRBs (Signaling Radio Bearers) with the first BS 110. For transmission of user plane data, the UE 102 may have one or more DRBs (Data Radio Bearers), with the second BS 120.

Figure 2:
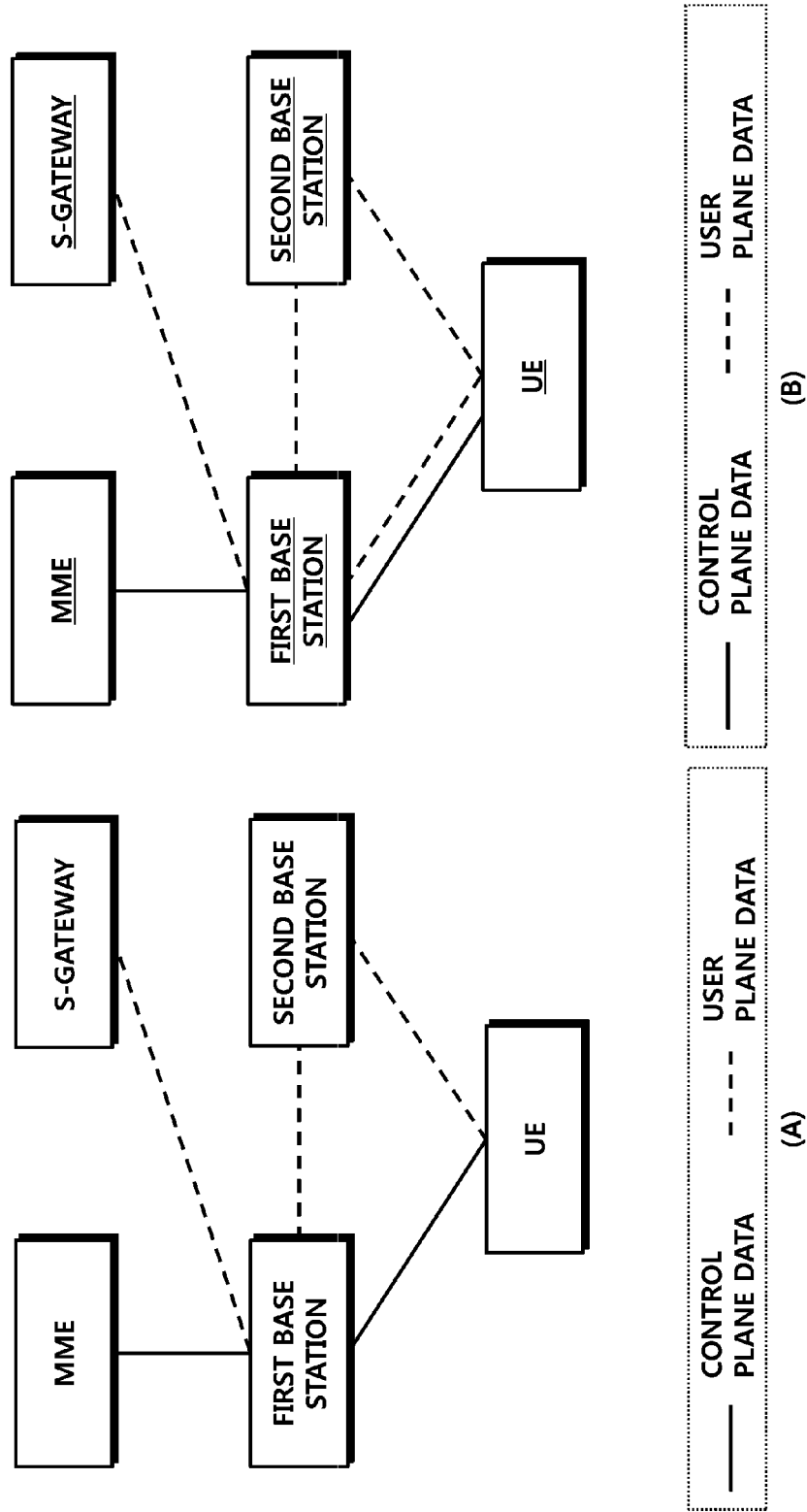
FIG. 2 is a diagram illustrating examples of transmitting user data through an interface between a first BS and a second BS to which the present invention is applied.

As described above, when the UE 102 executes user plane data transmission with the second BS 120 under a control of the first BS 110, the data may be transmitted through various paths. Hereinafter, the paths will be described in detail with reference to FIG. 2 and FIG. 3.

FIG. 2(a) is a diagram illustrating an example of transmitting user data through an interface between a first BS and a second BS to which the present invention is applied.

Referring to FIG. 2(a), user data may be transferred to the first BS from a Serving Gateway (S-GW) which is an Evolved Packet Core (EPC) entity, and the first BS transfers the same to a UE via the second BS.

FIG. 2(b) is a diagram illustrating another example of transmitting user data through an interface between a first BS and a second BS to which the present invention is applied.

Referring to FIG. 2(b), a UE may transmit user plane data through both the first BS and the second BS, or through only the first BS, under a control of the first BS (or through cooperation with the second BS). That is, the UE may establish a single RRC connection with the first BS, and may configure one or more Signaling Radio Bearers (SRBs) for transmission of control plane data. Also, for transmission of the user plane data, the UE may configure Data Radio Bearers (DRBs), with respect to the first BS and the second BS. Alternatively, for transmission of the user plane data, the UE may configure one or more Data Radio Bearers (DRBs), through only the first BS.

FIG. 3 is a diagram illustrating an example of transmitting user data through a second BS to which the present invention is applied.

Referring to FIG. 3, user data may be transferred to a UE directly from a Serving Gateway (S-GW) that is a core network entity, via the second BS.

For reference, in FIG. 2(a), FIG. 2(b), and FIG. 3, a solid line indicates a control plane data transmission path, and a broken line indicates a user plane data transmission path.

Different from FIG. 1, operations when a UE is included in one of a macro cell coverage and a small cell coverage, will be described.

The UE may transmit all data through only a first BS when the UE is in the first BS coverage (for example, a macro cell). That is, the UE may establish a single RRC connection with the first BS and may configure one or more Signaling Radio Bearers (SRBs), for transmission of control plane data. Also, for transmission of the user plane data, the UE may configure one or more Data Radio Bearers (DRBs) with the first BS.

Also, the UE may transmit all data through only a second BS when it is in the second BS coverage (for example, a small cell). That is, the UE may establish a single RRC connection with the second BS and may configure one or more Signaling Radio Bearers (SRBs), for transmission of control plane data. Also, for transmission of the user plane data, the UE may configure one or more Data Radio Bearers (DRBs) with the second BS.

The second BS may transmit user plane data under a control of the first BS or through the cooperation of the first BS.

In this instance, the UE may establish an RRC connection through only the first BS. That is, even through the UE is close to the second BS, but it is in the overlap of the macro cell coverage, the UE may receive a predetermined level of signal from the first BS. In this instance, the UE may establish an RRC connection through only the first BS. Also, a macro serving cell may provide NAS mobility information (for example, Tracking Area Identity (TAI) and a security input, in RRC connection establishment/re-establishment/handover. That is, the first BS may process a signaling required between the UE and the first BS, and a signaling between the UE and the second BS.

To briefly describe the case in which a cell associated with the second BS provides, to the UE, services together with a cell associated with the first BS, the cell associated with the second BS together with the cell associated with the first BS may be configured as serving cells, based on capabilities of the UE. Alternatively, based on the capabilities of the UE, the cell associated with the second BS may be configured as Secondary cells (SCells) under a control of the cell associated with the first BS. Alternatively, based on the capabilities of the UE, the cell associated with the second BS may be configured as Secondary cells (SCells) that transmit user plane data under a control of the cell associated with the first BS. Alternatively, based on the capabilities of the UE, the cell associated with the first BS may be configured as a serving cell that transmits control plane data, and the cell associated with the second BS may be configured as a serving cell that transmits user plane data.

As described above with reference to FIGS. 1 to 3, the scenario in which the UE executes communication with a network through the cell associated with the first BS and/or the cell associated with the second BS in the state where the first BS and the second BS are connected through a non-ideal backhaul.

Hereinafter, a procedure will be described, in which the UE configures a cell associated with the second BS and adds/modifies the cell (small cell) associated with the second BS for communication.

The UE may add or remove the cell associated with the second BS as a serving cell or an SCell for user plane data transmission. In addition, one or more Data Radio Bearers (DRBs) may be added or removed through the second BS. The procedure may be executed by an RRC signaling through the first BS.

When the first BS determines to add a cell associated with the second BS as a serving cell or an SCell, for transmission of user plane data through the second BS, the first BS may transmit all required system information of the cell associated with the second BS through an RRC signaling. Additionally or alternatively, when the first BS determines to add/modify one or more DRBs through the second BS, the first BS may transmit all required system information of the cell associated with the second BS through an RRC signaling. That is, in a connected mode, the UE may not need to obtain system information directly broadcasted from the cell associated with the second BS.

Figure 4:
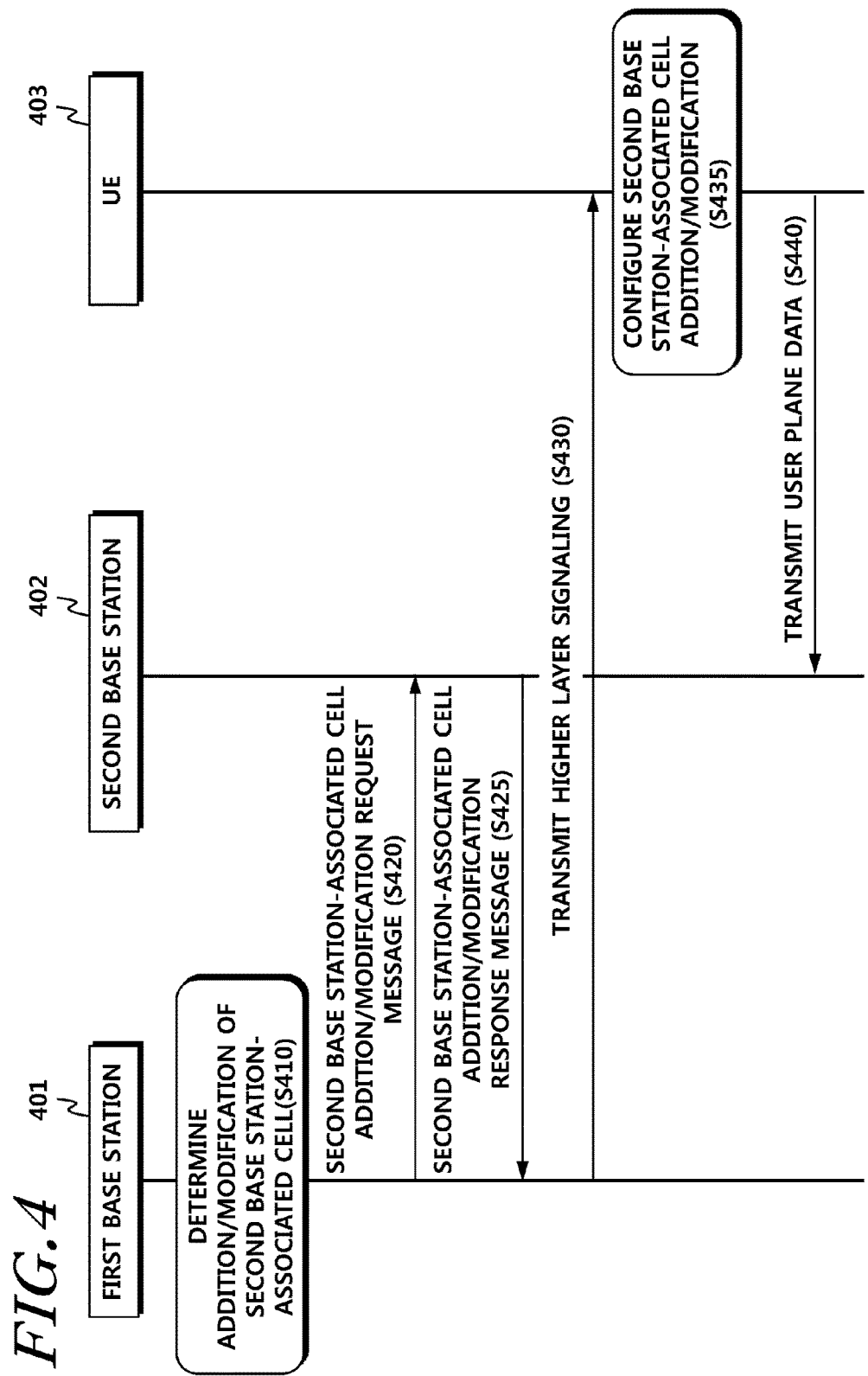
FIG. 4 is a diagram illustrating a procedure of adding/modifying a cell associated with a second BS to which the present invention is applied.

With reference to FIG. 4 a procedure for adding/modifying, by a UE, a cell associated with a second BS will be described in detail.

FIG. 4 is a diagram illustrating a procedure of adding/modifying a small cell to which the present invention is applied.

Referring to FIG. 4, a UE 403 may add a cell associated with a second BS when the UE 403 is in an RRC connected state by establishing an RRC connection with a first BS 401.

In step S410, the first BS 410 may determine addition/modification of a cell associated with the second BS.

The first BS 401 may transmit a message for requesting the second BS-associated cell addition/modification (a second BS cell addition/modification request message or a second BS addition/modification request message) in step S420.

The message for requesting second BS-associated cell addition/modification may include at least one of the following. Hereinafter, a second BS secondary cell indicates a cell that may be a second BS-associated cell and may be configured as an SCell for a UE.

message type information: information for identifying a procedure type of a message. The message may be a message for requesting second BS-associated cell addition/modification, or a message identical to a message for requesting the second BS to add/modify a radio bearer, and further including a request for second BS-associated cell addition/modification.

first BS UE X2AP ID: identification information assigned by the first BS.

second BS secondary cell (small cell) addition/modification request list: a list of second BS secondary cells of which addition/modification is requested by the first BS. A total of 4 SCells may be requested, which is equal to the number (maxSCell-r10) of available SCells in the single BS-based CA before Release 11. When one or more first BS-associated cells are added as SCells and configured for a UE, before the first BS requests second BS secondary cell addition/modification, before the first BS adds/modifies a radio resource of the second BS for a predetermined bearer, or before a second BS-associated secondary cell is configured for the UE, a predetermined number of SCells may be requested, which is equal to a number obtained by subtracting the number of the first BS-associated SCells configured for the current UE from the number (maxSCell-r10) of available SCells in a single base station-based CA before Release 11. For example, when two first BS-associated SCells are added for the current UE, a second BS secondary cell addition/modification request list included in the second BS secondary cell addition/modification request may request at most two SCells.

cell (small cell) ID: information associated with E-UTRAN Cell Global Identifier (ECGI) of a second BS-associated cell or information associated with a second BS-associated cell PCI (Physical Cell ID)

secondary cell (small cell) index: index information for identifying each second BS secondary cell (small cell) or SCell, from among SCells configured for a UE, second BS secondary cells (small cells) configured for a UE, second BS secondary cells (small cells) configured as SCells for a UE, or SCells configured as second BS secondary cells for a UE.

The second BS 402 that receives a message for requesting second BS-associated cell addition/modification from the first BS 401, may transmit, to the first BS 401, a message for responding to the second BS-associated cell addition/modification request in step S425.

The message for responding to the second BS-associated cell addition/modification request may include at least one piece of the following information.

message type information: information for identifying a procedure type of a message. The message may be a message for responding to a second BS-associated cell addition/modification request, or a message identical to a message for responding to a request for adding/modifying a radio bearer from the second BS, and further including a response to the second BS-associated cell addition/modification request.

first BS UE X2AP ID: identification information assigned by the first BS second BS UE X2AP ID: identification information assigned by the second BS second BS secondary cell (small cell) addition/modification request list: information associated with a list of second BS secondary cells including cell addition/modification information cell (small cell) identifier: information associated with a PCI of a second BS-associated cell and an Absolute Radio Frequency Channel Number (ARFCN)

secondary cell (small cell) index: index information for identifying each second BS secondary cell (small cell) or SCell, from among SCells configured for a UE, second BS secondary cells (small cells) configured for a UE, second BS secondary cells (small cells) configured as SCells for a UE, or SCells configured as second BS secondary cells for a UE.

The above described index (secondary cell index or second BS secondary cell (small cell) index) may be determined or assigned by the second BS. Also, this may not be included in a message of the first BS for requesting second BS-associated cell addition/modification.

In another embodiment, the above described index may be determined or assigned by the first BS and may be transmitted by being included in a message for requesting second BS-associated cell addition/modification, and may not be included in a message for responding to the second BS-associated cell addition/modification request.

In another embodiment, the above described index may be determined or assigned by the first BS 401 and may be transmitted by being included in a message for requesting second BS-associated cell addition/modification. The second BS 402 identifies and determines the index, and may send the index by including the same in a message for responding to the second BS-associated cell addition/modification request.

In another embodiment, the above described index may use a value (for example, 0 or 8) that is different from a value (for example, 1 to 7) that is used for an existing SCell index. In this instance, the index may or may not be included in both a message for requesting second BS-associated cell addition/modification and a message for responding to the second BS-associated cell addition/modification request. To use another value that is different from the value that has been used for the existing SCell index, SCell indices currently having integers from 1 to 7 are designed to have integers from 1 to 14, and the integers from 1 to 7 are used for indices for SCells of the first BS 401 and the integers from 8 to 14 are used for the second BS 402. In another embodiment, to distinguish an SCell index of the first BS 401 and an SCell index of the second BS 402, an SCell index and an indication information (or cell identifier of the second BS 402) field indicating that an SCell is configured through the second BS 402 may be transmitted together. In another embodiment, to distinguish an SCell index of the first BS 401 and an SCell index of the second BS 402, values (1 to 7) that may be used for SCell indices are divided and assigned as a first BS SCell index and a second BS index value. For example, only a value in a range from 1 to 4 is assigned as the first BS SCell index and only a value in a range from 5 to 7 is assigned as the second BS SCell index, only a value in a range from 1 to 3 is assigned as the first BS SCell index and only a value in a range from 4 to 7 is assigned as the second BS SCell index, and the like.

Common radio resource configuration information of a second BS-associated cell (radioresourceconfigcommon): essential information for UE to operate in a second BS-associated cell. For example, the information may include a physical layer configuration parameter corresponding system configuration information, or a physical layer configuration parameter and a MAC layer configuration parameter.

configuration (mac-MainConfig). For example, the cell dedicated radio resource configuration information associated with a second BS 402 may include at least one of PDCP layer configuration information for a radio bearer transmitted through the second BS 402 (only when the user plane structure of FIG. 3 is used), RLC layer configuration information for a radio bearer transmitted through the second BS 402, logical channel identity (logicalChannelIdentity) for a radio bearer transmitted through the second BS 402, logical channel configuration (logicalChannelConfig), MAC layer configuration information for a radio bearer transmitted through the second BS 402, and physical layer configuration information for a radio bearer transmitted through the second BS 402.

In step S430, the first BS 401 that receives the message to respond to the second BS-associated cell addition/modification request that may include at least one of the above information may transmit a higher layer signaling to the UE 403.

The first BS 401 may include information associated with a second BS-associated cell to be added/modified received through the second BS 402, or information associated with a second BS SCell to be added/modified (for example, SCellToAddMod or SeNBSCellToAddMod), in a higher layer signaling (for example, an RRC connection reconfiguration message), and may transmit the same in step S430.

The information associated with the second BS-associated cell to be added/modified may use information included in the message for responding to the second BS-associated cell addition/modification request, which has been described above.

The information associated with the second BS-associated cell to be added/modified may include at least one of the following information.

second BS secondary cell (small cell) addition/modification request list: information associated with a list of second BS secondary cells including cell addition/modification information secondary cell (small cell) identifier: information associated with a PCI of a second BS-associated cell and Absolute Radio Frequency Channel Number (ARFCN)

secondary cell (small cell) index: index information for identifying each second BS secondary cell (small cell) or SCell, from among SCells configured for a UE, second BS secondary cells (small cells) configured for a UE, second BS secondary cells (small cells) configured as SCells for a UE, or SCells configured as second BS secondary cells for a UE The above described index (secondary cell index or second BS secondary cell (small cell) index) may be determined or assigned by the second BS 402. Also, this may not be included in a message of the first BS 401 for requesting second BS-associated cell addition/modification.

In another embodiment, the above described index may be determined or assigned by the first BS 401, may be transmitted by being included in a message for requesting the second BS-associated cell addition/modification, and may not be included in a message for responding to the second BS-associated cell addition/modification request.

In another embodiment, the above described index may be determined or assigned by the first BS 401, may be transmitted by being included in a message for requesting the second BS-associated cell addition/modification, and may be identified and determined by the second BS 402 and may be included in a message for responding to the second BS-associated cell addition/modification request.

In another embodiment, a small cell index or an SCell index may use a value (for example, 0 or 8) that is different from a value (for example, 1 to 7) that is used for an existing SCell index. In this instance, the index may or may not be included in both the message for requesting the second BS-associated cell addition/modification and the message for responding to the second BS-associated cell addition/modification request. To use another value that is different from the value that has been used for the existing SCell index, SCell indices currently having integers from 1 to 7 are designed to have integers from 1 to 14, and the integers from 1 to 7 are used for indices for SCells of the first BS 401 and the integers from 8 to 14 are used for the second BS 402. In another embodiment, to distinguish an SCell index of the first BS and an SCell index of the second BS, an SCell index and an indication information (or cell identifier of the second BS) field indicating that an SCell is configured through the second BS may be transmitted together. In another embodiment, to distinguish an SCell index of the first BS 401 and an SCell index of the second BS 402, values (1 to 7) that may be used for SCell indices are divided and assigned as a first BS SCell index and a second BS index value. For example, only a value in a range from 1 to 4 is assigned as the first BS SCell index and only a value in a range from 5 to 7 is assigned as the second BS SCell index, only a value in a range from 1 to 3 is assigned as the first BS SCell index and only a value in a range from 4 to 7 is assigned as the second BS SCell index, and the like.

Common radio resource configuration information of a second BS-associated cell (radioresourceconfigcommon): Essential information for a UE 403 to operate in a second BS-associated cell, which includes a physical layer configuration parameter corresponding to system configuration information or information associated with a physical layer configuration parameter and a MAC layer configuration parameter dedicated radio resource configuration information of a second BS-associated cell: UE-specific configuration information of second BS-associated cell (for example, physical channel configuration (mac-MainConfig). For example, the cell dedicated radio resource configuration information associated with a second BS 402 may include at least one of PDCP layer configuration information for a radio bearer transmitted through the second BS 402 (only when the user plane structure of FIG. 3 is used), RLC layer configuration information for a radio bearer transmitted through the second BS, logical channel identity (logicalChannelIdentity) for a radio bearer transmitted through the second BS, logical channel configuration (logicalChannelConfig), MAC layer configuration information for a radio bearer transmitted through the second BS 402, and physical layer configuration information for a radio bearer transmitted through the second BS 402.

The UE 403 receives a higher layer signaling (an RRC Connection Reconfiguration message) including the information associated with the second BS-associated cell to be added/modified or the information (for example, SCellToAddMod) associated with the second BS SCell to be added/modified, from the first BS 401, in step S430, and adds or modifies the second BS-associate cell based on the higher layer signaling in step S435.

The UE 403 adds the second BS-associated cell based on the common radio resource information of the second BS-associated cell and the dedicated radio resource configuration information of the second BS-associated cell, for each described index included in the information associated with the second BS-associated cell to be added/modified or the information associated with the second BS SCell (for example, SCellToAddMod) to be added/modified, which is not a part of the current UE configuration (for each SCellIndex value included in the SCellToAddModList that is not part of the current UE configuration).

The UE 403 may configure a second BS-associated cell in a lower layer to be considered as a deactivated state. For example, when second BS-associated cell addition information is configured for a UE 403 that includes a configuration of a radio bearer through which user plane data is transmitted using the first BS 401 and the second BS 402 (in the state in which a radio bearer that additionally uses a radio resource of the second BS is configured), or when the second BS-associated cell addition information is configured in a higher layer signaling that is for transmitting user plane data using the first BS 401 and the second BS 401, the UE 403 may configure the second BS-associated cell added to the lower layer to be considered as a deactivated state. In another embodiment, when addition information of the second BS-associated cells is configured in a higher layer signaling for transmitting user plane data using the first BS 401 and the second BS 402, the UE 403 may configure the second BS-associated cells configured in the lower layer to be considered as a deactivated state, excluding one of the second BS-associated cells. For example, the UE 403 may configure a single predetermined cell to be activated to control activation/deactivation of second BS-associated cells, and may configure the remaining second BS-associated cells to be deactivated.

In another embodiment, when a second BS-associated cell is added as a serving cell or a second BS-associated cell is added as an SCell, the UE 403 configures a corresponding second BS-associated cell to be considered as an activated state. For example, when a (single) second BS-associated cell is added for the first time, a corresponding predetermined cell may be configured to be activated. When all the cells associated with the second BS 402 are configured to be deactivated, the second BS 402 may not activate a second BS-associated cell through second BS-associated cell, and thus, the second BS 402 may activate a second BS-associated cell through the first BS 401 to transmit data through a radio bearer configured through the second BS 402. This may cause a delay in data transmission through a backhaul delay between the first BS 401 and the second BS 402. Therefore, when a second BS-associated cell is added by the first BS 401 for the first time, a predetermined cell needs to be configured as an activated state.

Alternatively, when a second BS-associated cell is added for user plane data transmission, the UE 403 may configure a predetermined cell associated with the second BS 402 in a lower layer to be considered as an activated state. That is, when a second BS-associated cell is added to transmit user plane data using an additional radio resource of the second BS 402 that is distinguished from the first BS 401, for example, when second BS-associated cell addition information is configured in a higher layer signaling including configuration information of a radio bearer that is transmitted through only the second BS 402, the UE 403 may configure the predetermined cell associated with the second BS 402 in the lower layer to be considered as an activated state.

In another example, when second BS-associated cell addition information is configured in a higher layer signaling including configuration information of a radio bearer transmitted using the first BS 401 and the second BS 402, the UE 403 may configure a predetermined cell associated with the second BS 402 to be considered as an activated state. In another example, when second BS-associated cell addition information is newly configured in a higher layer signaling including configuration information of a radio bearer transmitted using the first BS 401 and the second BS 402, the UE 403 may configure a second BS-associated cell newly configured in a lower layer to be considered as an activated state until the newly configured second BS-associated cell is cancelled and/or a handover message is received.

In another example, when second BS-associated cell addition information is configured in a higher layer signaling including configuration information of a radio bearer transmitted using the first BS 401 and the second BS 402, the UE 403 may configure second BS-associated cells configured in a lower layer to be considered as an activated state until one or more of the second BS-associated cells configured in the lower layer are cancelled and/or a handover message is received. In this instance, the UE 403 may select a predetermined cell that is associated with a second BS 402 and has a high radio channel quality (or state) based on a radio channel quality (or state) from among second BS-associated cells and may configure the predetermined cell to be activated.

In another embodiment, the first BS 401 transfers, based on a measurement report received from the UE 403, information associated with a second BS-associated cell to be maintained as an activated state to transfer indication information indicating activation or deactivation of a second BS-associated cell to the UE 403 through a higher layer signal (an RRC Connection Reconfiguration message), so that the UE 403 selects a predetermined cell that is associated with the second BS 402 and has a high radio channel quality (or state) from among second BS-associated cells, and configures the predetermined cell to be activated so as to transfer indication information indicating activation or deactivation of a second BS-associated cell. The UE 403 may configure, based on the information, a predetermined cell that is associated with the second BS 402 and has a high radio channel quality (or state) to be activated, and may receive indication information indicating activation or deactivation of a second BS-associated cell through the configured cell of the second BS 402.

In another embodiment, the second BS 402 may generate information associated with a predetermined cell that is associated with the second BS 402 and is to be maintained as an activated state to transfer, to the UE 403 indication information, which indicates activation or deactivation of a second BS-associated cell, and may transmit the predetermined cell information to the first BS 401 through an RRC container. The UE 403 may select a cell that is associated with the second BS 402 and has a low load from second BS-associated cells based on load of a second BS-associated cell and the like, and configure the selected cell to be activated to transfer indication information indicating activation or deactivation of a second BS-associate cell.

The first BS 401 transfers the information to the UE 403 through a high layer signaling (an RRC Reconfiguration message). The UE 403 configures, based on the information, a predetermined cell that is associated with the second BS 402 and is to be maintained as an activated state until a cell is cancelled and/or a handover message is received, and may receive indication information indicating activation or deactivation of a second BS-associated cell through the predetermined cell that is associated with the second BS 402 and is configured to be activated.

In another embodiment, a procedure in which the first BS 401 and the second BS 402 select a predetermined cell that is configured to be activated before the cell is cancelled and/or a handover message is received, may be executed through the second BS-associated cell addition/modification and/or a second BS radio bearer addition/modification procedure. For example, the first BS 401 transmits to the second BS 402 information associated with a candidate cell(s) for a predetermined cell to be maintained as an activated state until a cell is cancelled and/or a handover message is received, and the second BS 402 may select from the candidate cell(s) information a predetermined cell to be maintained as an activated state until the cell is cancelled and/or a handover message is received, and transmit information associated with the selected cell to a UE 403 through the first BS 401.

When the quality of the predetermined cell is lower than a predetermined level based on measurement information and the like, the first BS 401 may change the predetermined cell to be maintained as an activated state until the cell is cancelled and/or a handover message is received and transmits the same to the UE 403, or includes the same in a request for second BS-associated cell addition/modification and/or in a rejection/response message to a request for adding/modifying a radio bearer from the second BS 403, and transmits the same to the second BS 402.

When the UE 403 configures a second BS-associated cell, the UE 403 may configure a predetermined cell associated with the second BS 402 to be activated. In this instance, at least one predetermined cell associated with the second BS 402 may be activated.

A predetermined cell associated with the second BS 402 may be expressed as a cell configured to be activated, a cell associated with the second BS 402, which is configured to be activated and the like. To this end, the first BS 401 may include information for indicating a predetermined cell associated with the second BS 402, information for indicating a predetermined cell associated with the second BS 402 for user plane data transmission, radio bearer configuration information (for example, RLC configuration information and logic channel configuration information) through a predetermined cell associated with the second BS 402, or a physical channel configuration information for a predetermined cell associated with the second BS 402, in information associated with a second BS-associated cell to be added/modified, received through the second BS 402, or information associated with an SCell to be added/modified (for example, SCellToAddMod or SeNBSCellToAddMod), received through the second BS 402, of the above described higher layer signaling (a RRC Connection Reconfiguration message).

In another embodiment, a value (for example, 0 or 8) may be used for a small cell index or an SCell index of the information associated with a second BS-associated cell to be added/modified or the information associated with the SCell to be added/modified, instead of a value (for example, 1 to 7) that has been used for an existing SCell index. Alternatively, to use another value that is different from the value that has been used for the existing SCell index, SCell indices currently having integers from 1 to 7 are designed to have integers from 1 to 14, and the integers from 1 to 7 are used for indices for SCells of the first BS 401 and the integers from 8 to 14 are used for the second BS 402.

In another embodiment, to distinguish an SCell index of the first BS 401 and an SCell index of the second BS 402, an SCell index and an indication information (or cell identifier of the second BS 402) field indicating that an SCell is configured through the second BS 402 may be transmitted together. In another embodiment, to distinguish an SCell index of the first BS 401 and an SCell index of the second BS 402, values that may be used for SCell indices are divided and assigned as a first BS SCell index and a second BS index value. For example, only a value in a range from 1 to 4 is assigned as the first BS SCell index and only a value in a range from 5 to 7 is assigned as the second BS SCell index, only a value in a range from 1 to 3 is assigned as the first BS SCell index and only a value in a range from 4 to 7 is assigned as the second BS SCell index and the like.

With respect to the index included in the information associated with a second BS-associated cell to be added/modified or the information associated with an SCell to be added/modified (SCellToAddMod or SeNBSCellToAddMod), which is not a part of a current UE configuration, a UE 403 may modify a second BS-associated cell based on received dedicated radio configuration information of a second BS-associated cell.

When a second BS-associated cell or an SCell that is added or modified, is activated, the UE 403 needs to receive a downlink PDCCH or PDSCH using the corresponding second BS-associated cell or SCell, and may execute a transmission in a corresponding uplink. The UE 403 may configure a radio bearer through the second BS 402, and may transmit user plane data, in step S440.

As described above with reference to FIG. 4, when a UE 403 adds a second BS-associated cell or add a second BS-associated cell as an SCell, a network may activate or deactivate a configured second BS-associated cell or SCell. Alternatively, a network may activate or deactivate second BS-associated cells through the second BS 402 excluding a cell configured to be always activated until an SCell is cancelled among configured second BS-associated cells or SCells. In this instance, a macro cell that operates as a PCell of the first BS 402 may be always activated.

A method in which a UE 403 activates or deactivates a second BS-associated cell or SCell, which is added or modified, will be described according to embodiments of the present invention.

Figure 5:
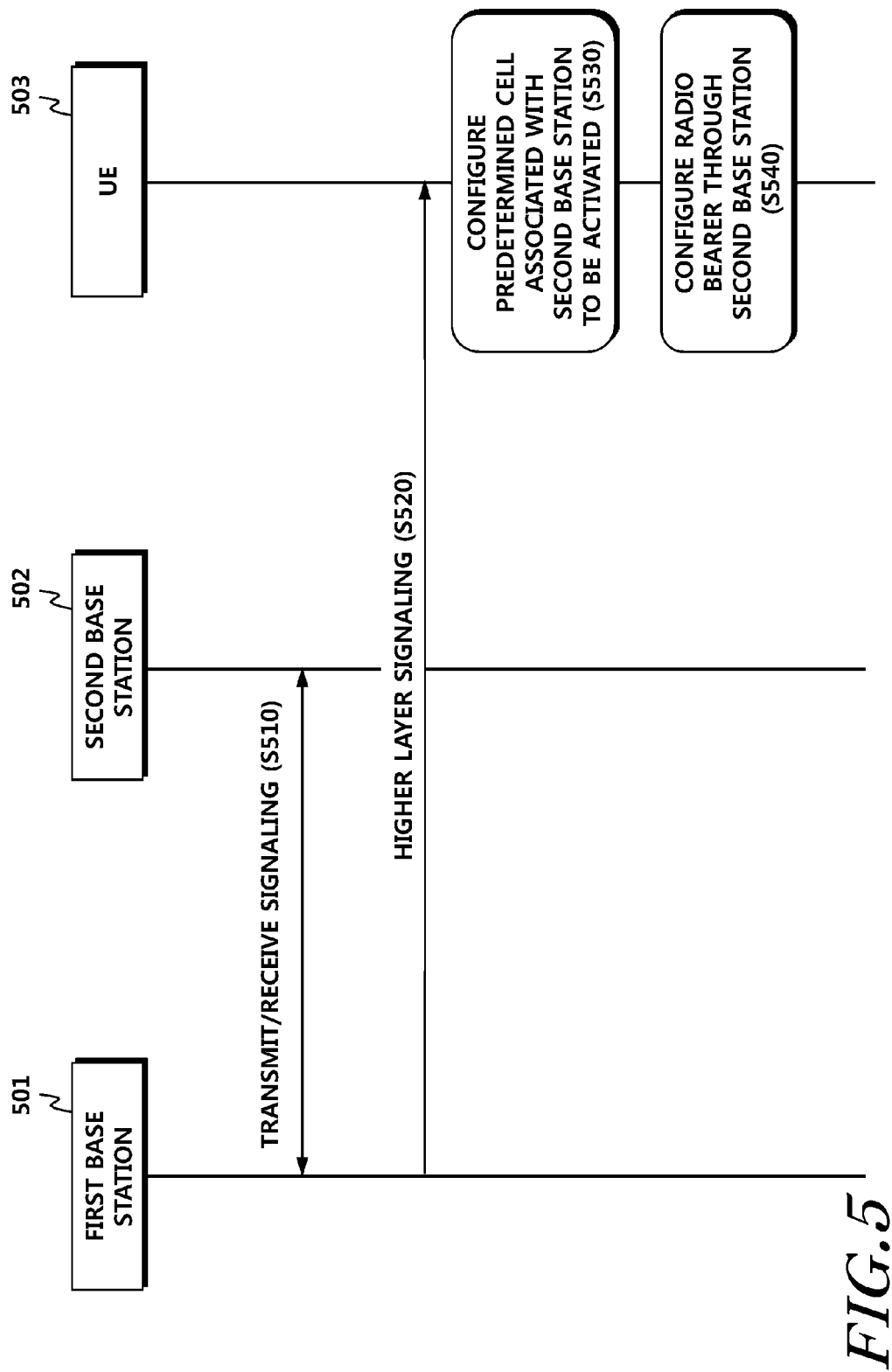
FIG. 5 is a diagram illustrating a procedure in which a UE activates/deactivates a cell associated with a second BS according to an embodiment of the present invention.

FIG. 5 is a diagram illustrating a procedure in which a UE 503 activates/deactivates a cell associated with a second BS 502 according to an embodiment of the present invention.

A method for a UE to activate or deactivate a second BS-associated cell according to an embodiment of the present invention, includes receiving a higher layer signaling that is received through a first BS after signaling between the first BS and a second BS, configuring a predetermined cell associated with the second BS to be activated, and configuring a radio bearer through the second BS.

Referring to FIG. 5, a signaling procedure between a first BS 501 and a second BS 502 is executed, in step S510. In this instance, the signaling may be executed through an interface established between the first BS 501 and the second BS 502.

Also, the signaling between the first BS 501 and the second BS 502 according to another embodiment of the present invention may configure cell index information by distinguishing a cell associated with the first BS 501 and a cell associated with the second BS 502.

Subsequently, the first BS 501 transmits a higher layer signaling to the UE 503 in step S520.

The higher layer signaling may include addition/modification configuration information of a cell associated with the second BS 502, and the addition/modification configuration information of a cell associated with the second BS 502 may include cell information associated with a cell to which activation or deactivation indication information of a second BS-associated cell is to be transferred or cell information associated with a cell to be maintained as an activated state.

The UE 503 may receive a higher layer signaling from the first BS 501, and may configure a predetermined cell associated with the second BS 502 to be activated, in step 530. As described above, when a plurality of cells is associated with the second BS 502, at least one predetermined cell may be configured to be activated.

The UE 503 may configure a radio bearer through the second BS, in step S540.

Figure 6:
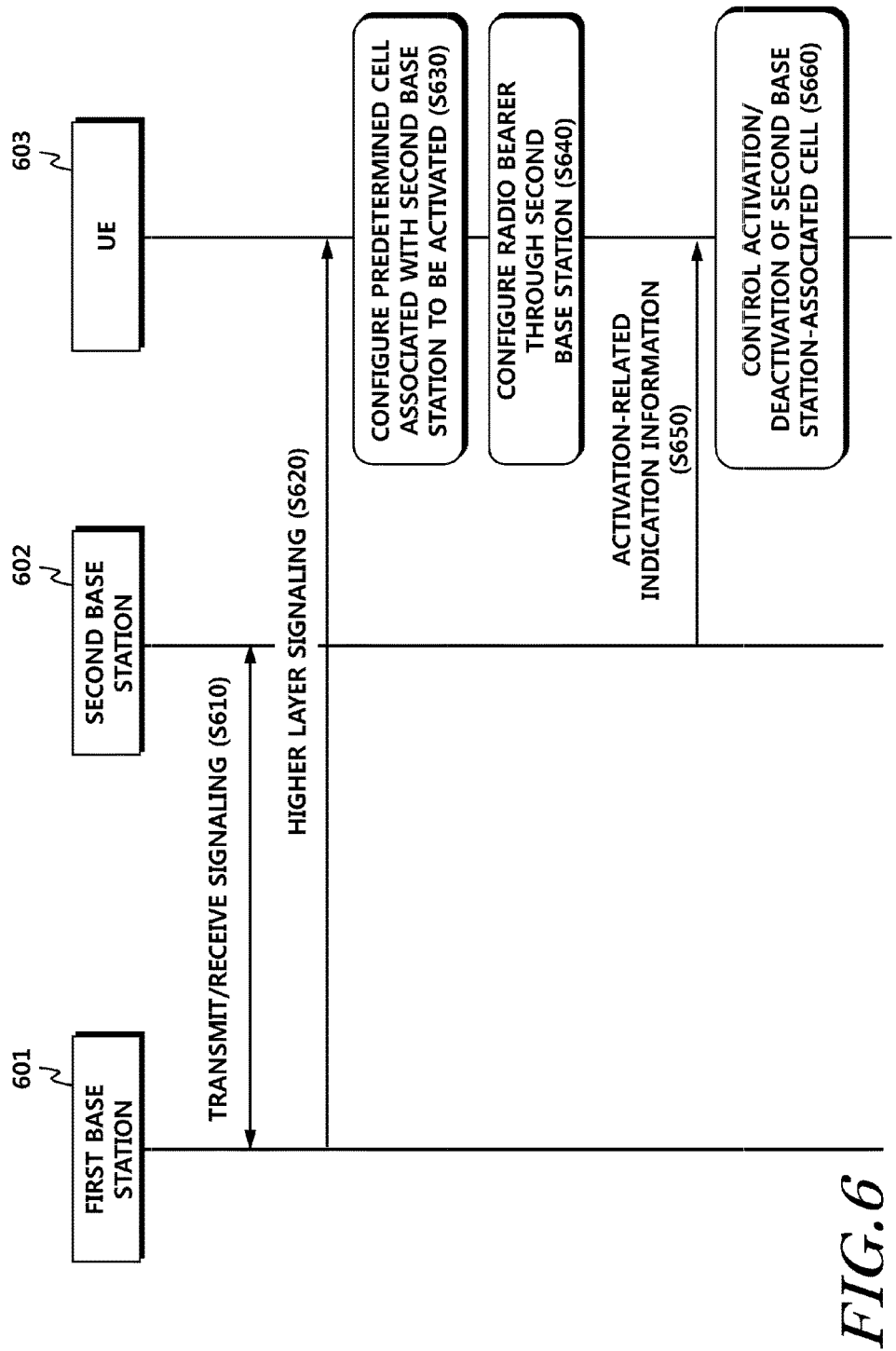
FIG. 6 is a diagram illustrating a procedure in which a UE activates/deactivates a cell associated with a second BS according to another embodiment of the present invention.

FIG. 6 is a diagram illustrating a procedure in which a UE 603 activates/deactivates a cell associated with a second BS 602 according to another embodiment of the present invention.

A method of a UE according to another embodiment of the present invention may further include receiving activation-related indication information, including information indicating activation or deactivation of a cell that is distinguished from a predetermined cell configured to be activated from among cells associated with the second BS, through the second BS, and controlling the cell distinguished from the predetermined cell configured to be activated from among cells associated with the second base station, to be activated or deactivated, based on the activation-related indication information.

Referring to FIG. 6, a signaling procedure between a first BS 601 and the second BS 602 is executed, in step S610. In this instance, the signaling may be executed through an interface established between the first BS 601 and the second BS 602.

The signaling between the first BS 601 and the second BS 602 according to another embodiment of the present invention may configure cell index information by distinguishing a cell associated with the first BS 601 and a cell associated with the second BS 602.

Subsequently, the first BS 601 transmits a higher layer signaling to the UE 603 in step S620.

The higher layer signaling may include addition/modification configuration information of a cell associated with the second BS 602, and the addition/modification configuration information of a cell associated with the second BS 602 may include cell information associated with a cell to which activation or deactivation indication information of a second BS-associated cell is to be transferred or cell information associated with a cell to be maintained as an activated state.

The UE 603 may receive a higher layer signaling from the first BS 601, and may configure a predetermined cell associated with the second BS 602 to be activated in step 630. As described above, when a plurality of cells is associated with the second BS 602, at least one predetermined cell may be configured to be activated.

The UE 603 may configure a radio bearer through the second BS in step S640.

The UE 603 may receive activation-related indication information from the second BS 602 in step S650. The activation-related indication information may be included in a Medium Access Control (MAC) signaling and may be received through the same, and may include at least one of a MAC control element and a MAC header, which includes a field indicating whether to activate a cell that is different than a predetermined cell configured to be activated from among second BS-associated cells.

Information included in the MAC signaling will be described in detail with reference to FIG. 11.

Figure 7:
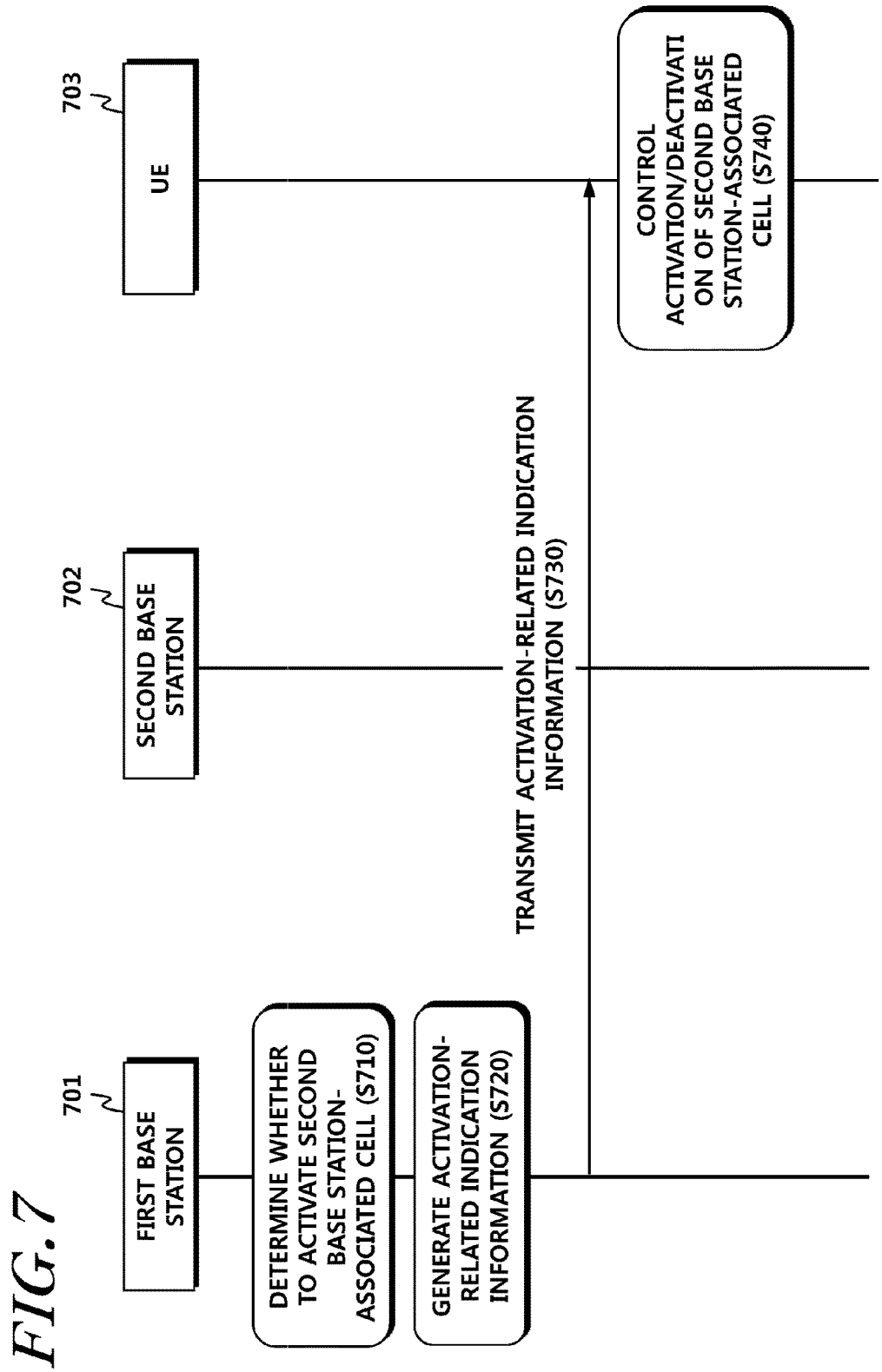
FIG. 7 is a diagram illustrating a procedure in which a UE activates/deactivates a cell associated with a second BS according to another embodiment of the present invention.

FIG. 7 is a diagram illustrating a procedure in which a UE 703 activates/deactivates a cell associated with a second BS 702 according to another embodiment of the present invention.

A method for the UE 703 that adds a second-BS associated cell as a serving cell to activate or deactivate a second-BS associated cell according to an embodiment of the present invention, includes receiving activation-related indication information including information indicating activation or deactivation of a second BS-associated cell, from one of a first BS 701 that provides a macro cell and the second BS 702 that provides a second BS-associated cell, and controlling activation or deactivation of a cell that is different than a predetermined cell configured to be activated, from among second BS-associated cells, based on the activation-related indication information.

Alternatively, the activation-related indication information according to the present invention may be received by being included in a Media Access Control (MAC) signaling or a higher layer signal, and the MAC signaling may include a MAC control element and/or MAC header, which includes a field indicating whether to activate a cell that is different than a predetermined cell configured to be activated from among second BS-associated cells.

A method in which the UE 703 that activates or deactivates an added second BS-associated cell will be described in detail with reference to FIG. 7.

Method of Using a MAC Signaling Through a First BS 701

The UE 703 according to an embodiment of the present invention may receive activation-related indication information including indication information indicating activation or deactivation of a second BS-associated cell from the first BS 701 in step S730.

Also, the activation-related indication information includes an activation/deactivation MAC control element, and may be transmitted by the first BS 701 through a MAC signaling in step S730.

The UE 703 activates or deactivates a second BS-associated cell, based on the received MAC signaling, in step S740.

In other words, the first BS 701 according to an embodiment of the present invention, determines whether to activate a second BS-associated cell in step S710.

Subsequently, the first BS 701 generates activation-related indication information of a second BS-associated cell which is a target of activation or deactivation, in step S720.

The generated activation-related indication information is transmitted to the UE 703 through a MAC signaling in step S730, and the UE 703 activates or deactivates a second BS-associated cell based on the received activation-related indication information in step S740.

The UE 703 maintains a second BS-associated cell deactivation timer, for a configured second BS-associated cell. When the second BS-associated cell deactivation timer expires, the UE 703 may deactivate a second BS-associated cell that is associated with the expiration. The second BS-associated cell deactivation timer may be configured by an RRC. The first BS 701 may not quickly acknowledge information associated with an activated state of a second BS secondary cell due to a non-ideal backhaul delay, and thus, the deactivation timer may define and configure a field that is different from a secondary cell deactivation timer (sCellDeactivationTimer-r10) of the first BS 701.

Also, the activation-related indication information may be transmitted through a higher layer signaling, in addition to a MAC signaling, and this will be described in the embodiments below.

A detailed process in which the UE 703 receives activation-related indication information, and activates or deactivates a second BS-associated cell will be described with reference to FIG. 8 and FIG. 9.

Figure 8:
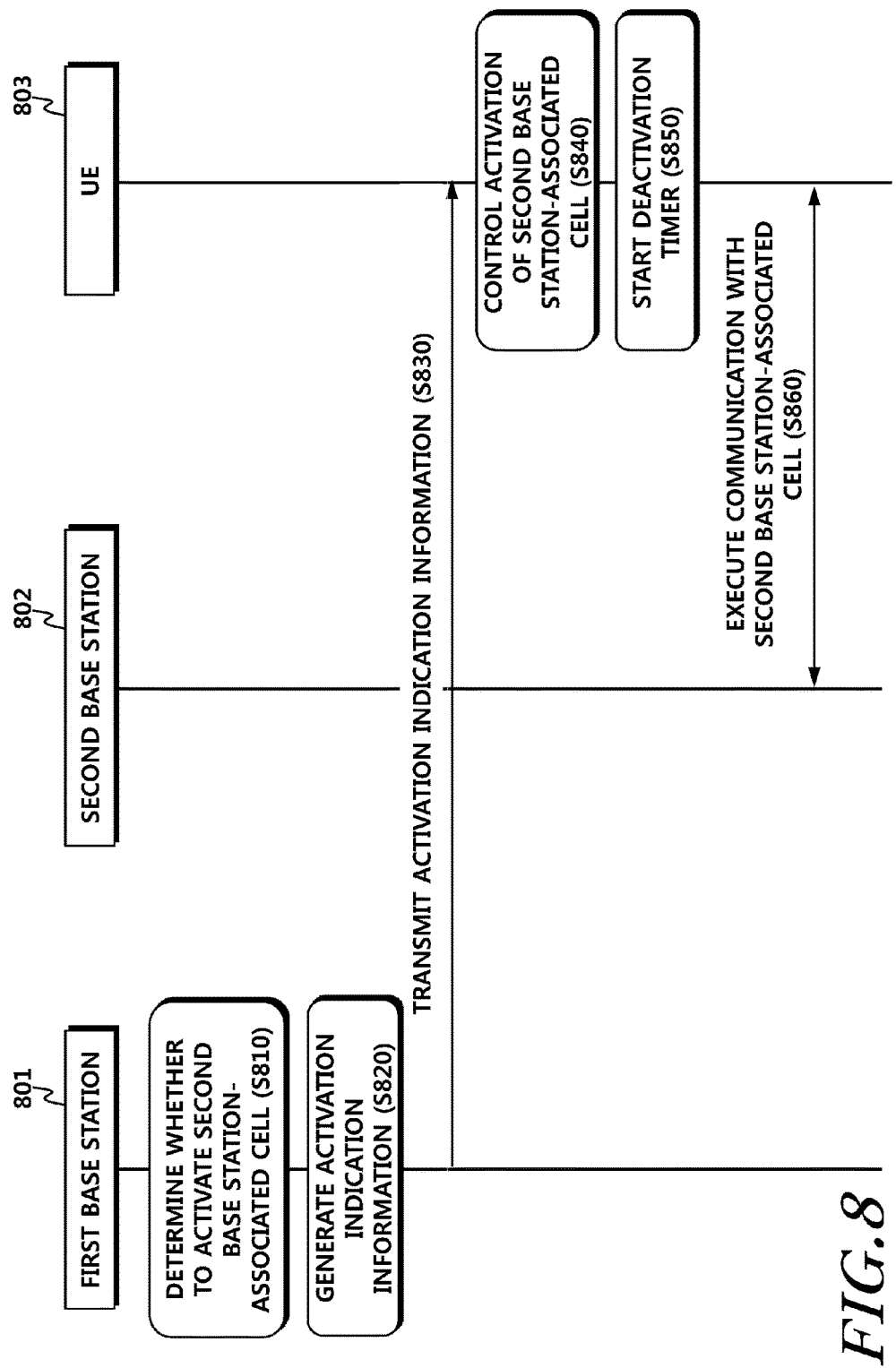
FIG. 8 is a diagram illustrating a procedure in which a UE activates a cell associated with a second BS according to another embodiment of the present invention.

FIG. 8 is a diagram illustrating a procedure in which a UE 803 activates a cell associated with a second BS 802 according to another embodiment of the present invention.

In the process in which the UE 803 controls activation or deactivation of a second BS-associated cell based on activation-related indication information received from a first BS 801, when the activation-related indication information includes activation indication information, a method of the UE 803 according to another embodiment of the present invention may further include activating a second BS-associated cell, and starting a deactivation timer.

With reference to FIG. 8, when the UE 803 receives activation-related indication information indicating activation of a second BS-associated cell at a corresponding Transmission Time Interval (TTI), the UE 803 activates a second BS-associated cell at the corresponding TTI, with respect to each TTI and each configured second BS-associated cell. In another embodiment, considering a non-ideal backhaul delay between the first BS 801 and the second BS 802, when the UE 803 receives activation-related indication information indicating activation of a second BS-associated cell at a corresponding TTI, the UE 803 activates a second BS-associated cell at a TTI after a non-ideal backhaul delay between the first BS 801 and the second BS 803 from the corresponding TTI (or a TTI after two times the non-ideal backhaul delay between the first BS 801 and the second BS 802 from the corresponding TTI), with respect to each TTI and each configured second BS-associated cell.

That is, the first BS 801 determines whether to activate a second BS-associated cell based on a measurement report associated with a second BS-associated cell, a load of the first BS 801 and the like in step 810, and determines activation and generates activation indication information in step S820.

In another embodiment of FIG. 8, the first BS 801 determines whether to activate a second BS-associated cell based on a measurement report associated with a second BS-associated cell, a load of the first BS 801 and the like, and requests an activation indication through the second BS 802. Then, the second BS 802 generates activation indication information and transfers the activation indication information to the UE 803.

As described with reference to FIGS. 5 to 7, activation-related indication information may be transmitted through a MAC signaling, and a MAC control element and/or MAC header, which includes field information indicating a second BS-associated cell which is a target of activation in a MAC CE.

The first BS 801 transmits the activation indication information to the UE 803 in step S830.

The UE 803 may activate a second BS-associated cell that is the target of activation and is indicated by the MAC header, based on the received activation indication information, in step S840. Also, the UE 803 may start a second BS-associated cell deactivation timer in step S850.

When the second BS-associated cell is activated, the UE 803 may communicate with the second BS 802 through the corresponding second BS-associated cell in step S860.

When the UE 803 receives activation indication information the UE 803 operates a normal second BS-associated cell operation (SRS transmission or CQI/PMI/RI/PTI measurement reporting from the corresponding second BS-associated cell, or PDCCH monitoring of and for the corresponding second BS-associated cell and the like). The UE 803 starts a second BS-associated cell deactivation timer associated with the second BS-associated cell in step S850

Steps 840 and S850 may be sequentially executed, in parallel, or in a different order.

As described above, when the second BS-associated cell deactivation timer expires the corresponding second BS-associated cell may be deactivated.

Figure 9:
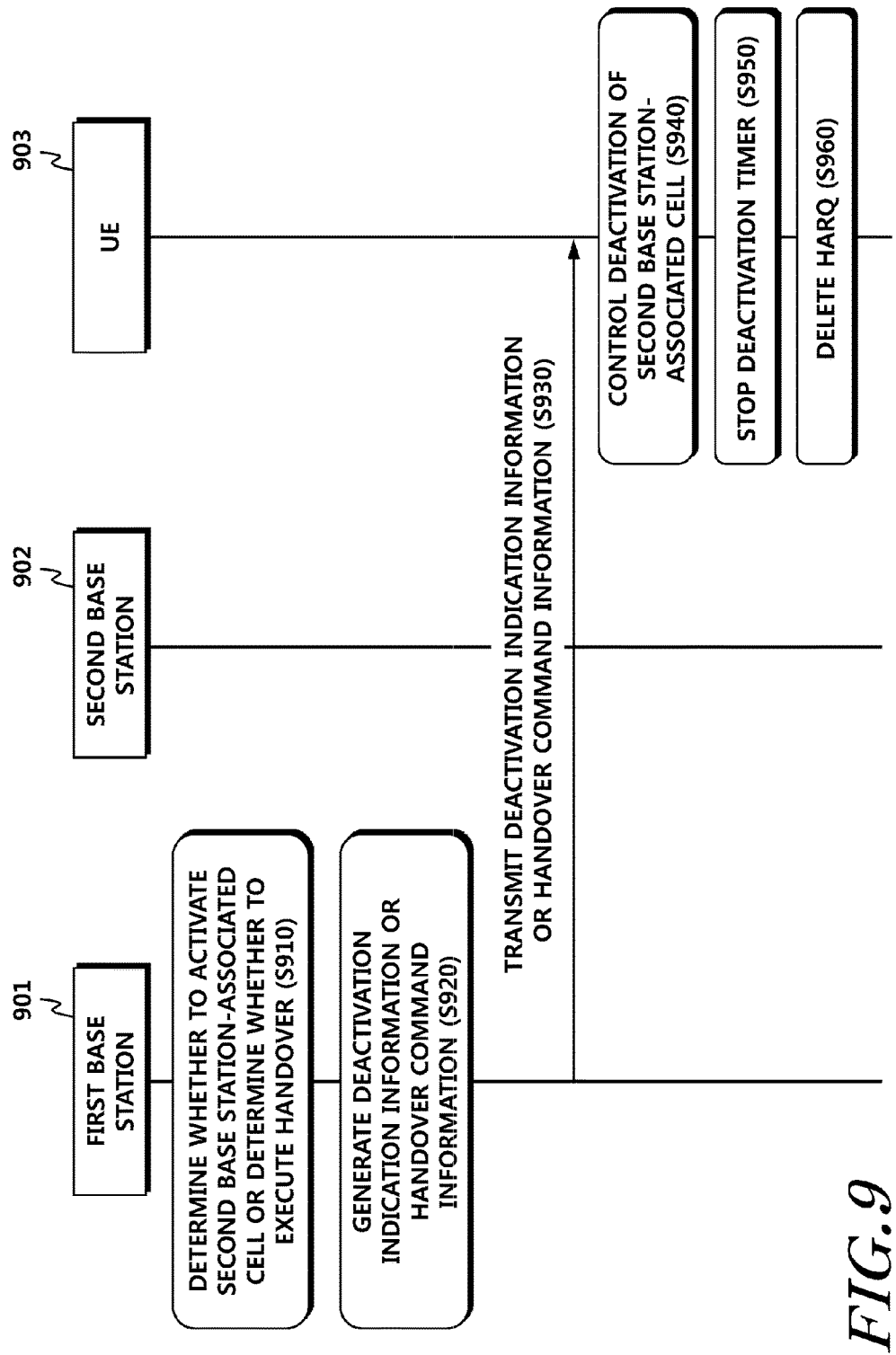
FIG. 9 is a diagram illustrating a procedure in which a UE deactivates a small cell according to another embodiment of the present invention.

FIG. 9 is a diagram illustrating a procedure in which a UE 903 deactivates a second BS-associated cell according to another embodiment of the present invention.

In the process where the UE 903 controls activation or deactivation of a second BS-associated cell, based on activation-related indication information received from a first BS 901, when the UE 903 receives a higher layer signaling (RRC Reconfiguration message) including handover command information (mobilityControlInfo), the method of the UE 903 further includes deactivating a second BS-associated cell or all second BS-associated cells, stopping a deactivation timer, and deleting a Hybrid Automatic Repeat request (HARQ).

With reference to FIG. 9, the first BS 901 determines whether to activate a second BS-associated cell, or determines whether to execute a handover of a macro cell in step S910.

Based on the determination of the first BS 901, when deactivation of a second BS-associated cell or a handover of a macro cell is determined, the first BS 901 generates corresponding information in step S920.

The UE 903 receives the generated deactivation indication information or the handover command information from the first BS 901 in step S930.

When the activation-related indication information including deactivation indication information or handover command information is received through a higher layer signaling, the UE 903 deactivates a second BS-associated cell or all second BS-associated cells in step S940.

Subsequently, the UE 903 stops a second BS-associated cell deactivation timer in step S950, and deletes (flushes) a HARQ in step S960. The above described steps S940 and S960 may be executed sequentially, in parallel, in a different order.

In the CA technology before 3GPP Release-11, when a UE 903 receives a handover command, the UE 903 executes a handover to a target PCell and thus, there is no need to deactivate a source PCell that is always maintained as an activated state in a single BS 901. That is, the UE 903 may configure a PCell using a target PCell, without deactivating the source PCell. However, in the case of the UE 903 that transfers data through an additional radio resource of the second BS 902 that is distinguished from the first BS 901, the UE 903 may activate/deactivate second BS-associated cells through the second BS 902. To this end, in the case of a cell that is configured to be activated while a second BS-associated cell is maintained, when a handover command is received, second BS-associated cells have a high possibility of being cancelled through a handover, and thus, upon receiving a higher layer signaling including handover command information, deactivation of all second BS-associated cells may be needed.

Each operation will be described in detail.

When a MAC CE including deactivation indication information is received, the UE 903 deactivates a second BS-associated cell at a TTI, stops a second BS-associated cell deactivation timer, and removes (flushes) a HARQ buffer associated with the corresponding second BS-associated cell.

Alternatively, when the second BS-associated deactivation timer expires at a corresponding TTI, the UE 903 deactivates a second BS-associated cell at the TTI, stops a second BS-associated cell deactivation timer, and removes (flushes) a HARQ buffer associated with the second BS-associated cell.

Alternatively, when the UE 903 receives handover command information, the UE 903 configures a second BS-associated cell configured in a lower layer to be considered as a deactivated state.

That is, when the UE 903 receives an RRC connection reconfiguration message including mobility control information from the first BS 901, the UE 903 configures a second BS-associated cell or a second BS-associated cell configured as an SCell in a lower layer, to be considered as a deactivated state. The UE 903 may maintain a second BS-associated cell to be deactivated until second BS-associated cell activation indication information is received.

Figure 10:
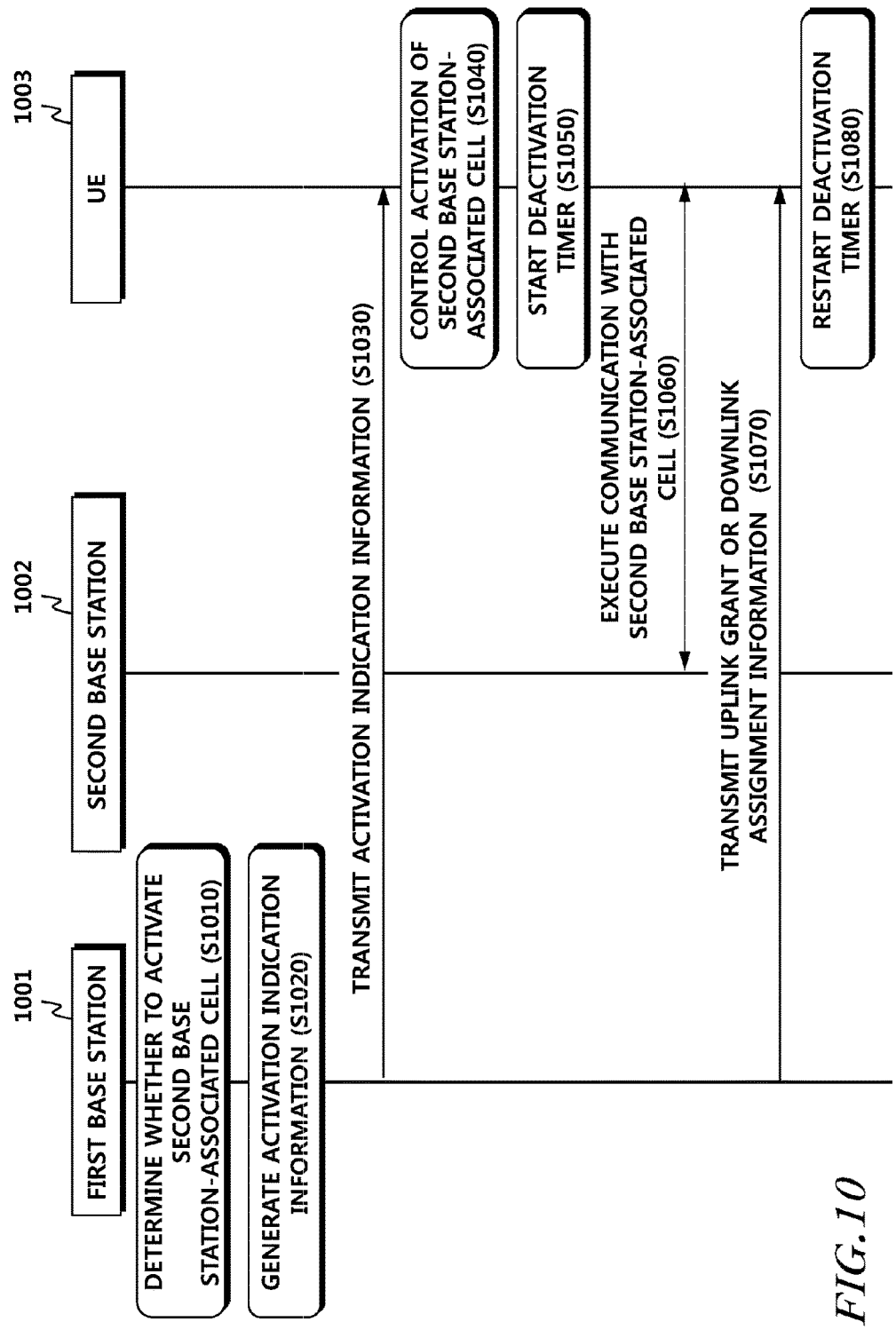
FIG. 10 is a diagram illustrating operations when a UE receives an uplink grant or downlink assignment information when a cell associated with a second BS is activated, according to another embodiment of the present invention.

FIG. 10 is a diagram illustrating operations when a UE 1003 receives an uplink grant or downlink assignment information when a cell associated with a second BS 1002 is activated, according to another embodiment of the present invention.

When the UE 1003 according to another embodiment of the present invention receives at least one of uplink grant and downlink assignment information in association with a second BS-associated cell, the UE 1003 restarts a deactivation timer for a second BS-associated cell.

Referring to FIG. 10, when a PDCCH with respect to an activated second BS-associated cell indicates uplink grant (UL grant) or downlink assignment (DL assignment), the UE 1003 may restart a deactivation timer for the corresponding second BS-associated cell in step S1080.

Alternatively, when a PDCCH for a serving cell that schedules an activated second BS-associated cell indicates UL grant or DL assignment, the UE 1003 may restart a deactivation timer for the second BS-associated cell.

As described with reference to FIGS. 5 and 6, the first BS 1001 determines whether to activate a second BS-associated cell in step S1010, and generates activation indication information in step S1020.

Subsequently, the first BS 1001 transmits the activation indication information in step S1030.

The UE 1003 activates a second BS-associated cell based on the received activation indication information, and starts a second BS-associated cell deactivation timer in step S1050.

Steps S1010 to S1060 may be similar to the steps described with reference to FIGS. 5 and 6.

Subsequently, when UL grant or DL assignment information according to another embodiment of the present invention is received, the UE 1003 restarts the ongoing second BS-associated cell deactivation timer in step S1080.

For example, the UE 1003 may execute a control to begin the progress of the second BS-associated cell deactivation timer, from the first, after a second BS-associated cell is activated. When the second BS-associated cell deactivation timer expires, a second BS-associated cell may be deactivated. Therefore, through restarting the second BS-associated cell deactivation timer, an activation time of a corresponding second BS-associated cell configured for the UE 1003 may increase.

As described above, the first BS transmits a MAC signaling including information indicating activation or deactivation of a second BS-associated cell configured for the UE 1003, so as to control activation of a second BS-associated cell of the UE 1003.

Hereinafter, a method of including indication information for controlling activation of a second BS-associated cell in a MAC signaling, will be described in detail with reference to FIG. 11.

Figure 11:
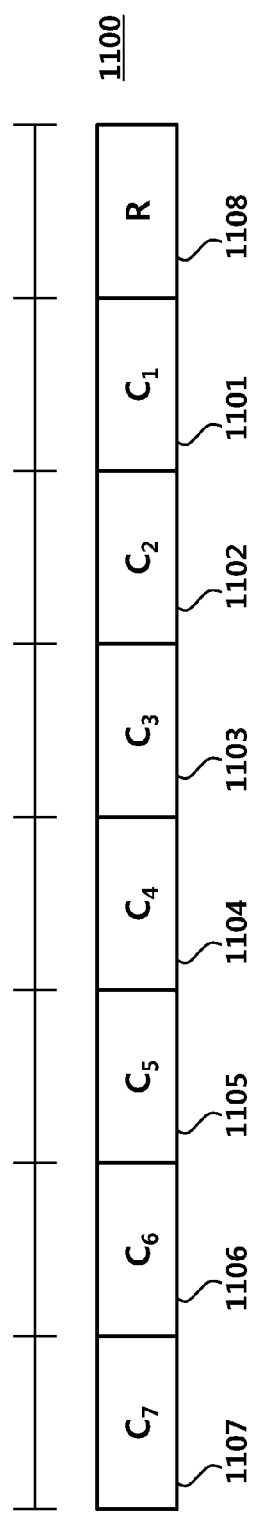
FIG. 11 is a diagram illustrating a MAC control element that includes activation-related indication information according to the present invention.

FIG. 11 is a diagram illustrating a MAC control segment that includes activation-related indication information according to the present invention.

Referring to FIG. 11, an activation/deactivation MAC control segment 1100 may be identified based on a MAC PDU subheader including a logical channel ID (LCID).

For example, the MAC control segment 1100 has a fixed size and is configured as a single octet including seven C-fields (1101 to 1107) and a single R-field 1108.

When a second BS-associated cell configured based on an SCell index (SCellindex) or a second BS-associated cell index i exists this field 1101 to 1108 may indicate activation of the SCell or the second BS-associated cell, which has the SCell index i or the second BS-associated cell index i.

Alternatively, when a second BS-associated cell configured as an SCell based on an SCell index i exists this field 1101 to 1108 may indicate activation of the second BS-associated cell having the SCell index i or the second BS-associated cell index i.

Particularly, for example, when the Ci field 1101 to 1107 is set to "1", this indicates that a corresponding SCell or a corresponding second BS-associated cell should be activated. When the Ci field 1101 to 1107 is set to "0", this indicates that a corresponding SCell or a corresponding second BS-associated cell should be deactivated.

In another embodiment, when the above described second BS-associated cell is configured, activation/deactivation of the second BS-associated cell may be indicated by the R field.

When the R field 1108 is set to "1", this may indicate that the second BS-associated cell should be activated. When the R field 1108 is set to "0", this may indicate that the second BS-associated cell should be deactivated. When a second BS-associated cell is added under a control of a macro cell or through cooperation with a macro cell and activation/deactivation is distinguished using the R field, the above described second BS-associated cell index or SCell index may not be used, or a value (for example, C8) that is different from a value (for example, C1-C7) that is used for an SCell index of a first BS, may be added and used. As another example of indicating activation/deactivation of a second BS-associated cell using the R field, when the R field 1008 is set to "1", a Ci field indicates that a secondary cell (small cell) of the second BS, which has a secondary cell index i, should be activated ("1")/deactivated ("0"), and when the R field 1108 is set to "0", the Ci field indicates that a secondary cell of the first BS, which has a secondary cell index i, should be activated/deactivated. As another example, one of the Ci fields (for example, C6 or C7) is designated to distinguish secondary cells of the first BS and secondary cells of the second BS, and when the predetermined Ci field (for example, C6 or C7) is set to "1", the other Ci fields (for example, C1, C2, C3, C4, and C5) indicate that a secondary cell (small cell) of the second BS, which has a secondary cell index i should be activated ("1")/deactivated ("0"), and when the predetermined Ci field (for example, C6 or C7) is set to "0", the other Ci fields (for example, C1, C2, C3, C4, and C5) may indicate that a secondary cell of a master BS, which has a secondary cell index i should be activated/deactivated.

In another embodiment, when the above described second BS-associated cell is configured, a value for a logical channel ID (LCID) included in a MAC PDU subheader for identifying an activation/deactivation MAC control element with respect to secondary cells of the second BS, may be used, which is different from the LCID value 11011 for identifying an activation/deactivation MAC control element with respect to secondary cells of the first BS, so that a UE distinguishes secondary cells of the first BS and secondary cells of the second BS.

The detailed embodiment in which a UE receives activation-related indication information from the first BS, and activates or deactivates a second BS-associated cell, has been described.

A secondary cell of the first BS and a secondary cell of the second BS are used to distinguish which cell corresponds to which BS among the cells configured as secondary cells for the UE, when a plurality of cells is configured for the UE. Therefore, each of the secondary cell of the first BS and the secondary cell of the second BS may be construed as identical meanings to a first BS-associated cell and a second BS-associated cell, respectively.

Method of Using an RRC Signaling Through a First BS

A first BS according to another embodiment of the present invention may transmit to a UE the above described activation-related indication information through a higher layer signaling.

As described with reference to FIGS. 7 to 10, the first BS transmits activation-related indication information to the UE, and the UE activates or deactivates a second BS-associated cell based on the received activation-related indication information.

In this instance, the present invention according to the another embodiment may include the activation-related indication information in a higher layer signaling (for example, RRC signaling) for transmission.

Also, operations of the UE that receives the activation-related indication information may operate as described with reference to FIGS. 7 to 10.

The first BS includes information associated with activation/deactivation of a second BS-associated cell in an RRC connection reconfiguration message and transmits the same to the UE to activate or deactivate a second-BS associated cell. That is, when the RRC connection reconfiguration message that includes an additional radio resource configuration of the second BS that is distinguished from the first BS is received through second BS-associated cell addition/modification and/or a procedure of adding/modifying a radio bearer to the second BS, the UE may activate or deactivate a second BS-associated cell.

As described the above, the UE may maintain a second BS-associated cell deactivation timer with respect to a configured second BS-associated cell, and may deactivate the second BS-associated cell that is associated with the expiration of the deactivation timer. The second BS-associated deactivation timer may be configured by an RRC signaling.

As described above, when the UE receives indication information indicating activation of a second BS-associated cell through a higher layer signaling the UE activates a second BS-associated cell.

A normal second BS-associated cell operation (for example, SRS transmission or CQI/PMI/RI/PTI measurement reporting from the corresponding second BS-associated cell, or PDCCH monitoring of the corresponding second BS-associated cell and PDCCH monitoring for the corresponding second BS-associated cell and the like) may be applied. The UE may start a second BS-associated cell deactivation timer associated with the second BS-associated cell.

When indication information indicating deactivation of a second BS-associated cell is received through a higher layer signaling, the UE deactivates a second BS-associated cell, stops a second BS-associated cell deactivation timer, and removes (flushes) a HARQ buffer associated with the second BS-associated cell.

In addition, when the second BS-associated cell deactivation timer expires or handover command information is received through a higher layer, the UE deactivates a second BS-associated cell, stops a second BS-associated cell deactivation timer, and removes (flushes) a HARQ buffer associated with the second BS-associated cell.

As described with reference to FIG. 10, while a second BS-associated cell is activated, when a PDCCH for the second BS-associated cell indicates UL grant or DL assignment, or a PDCCH for a serving cell that schedules the second BS-associated cell indicates UL grant or DL assignment, a second BS-associated cell deactivation timer associated with the second BS-associated cell may be restarted.

Hereinafter, operations of the first BS will be described in association with the method of activating or deactivating a second BS-associated cell according to embodiments of the present invention, which have been described with reference to FIGS. 5 to 10.

Figure 12:
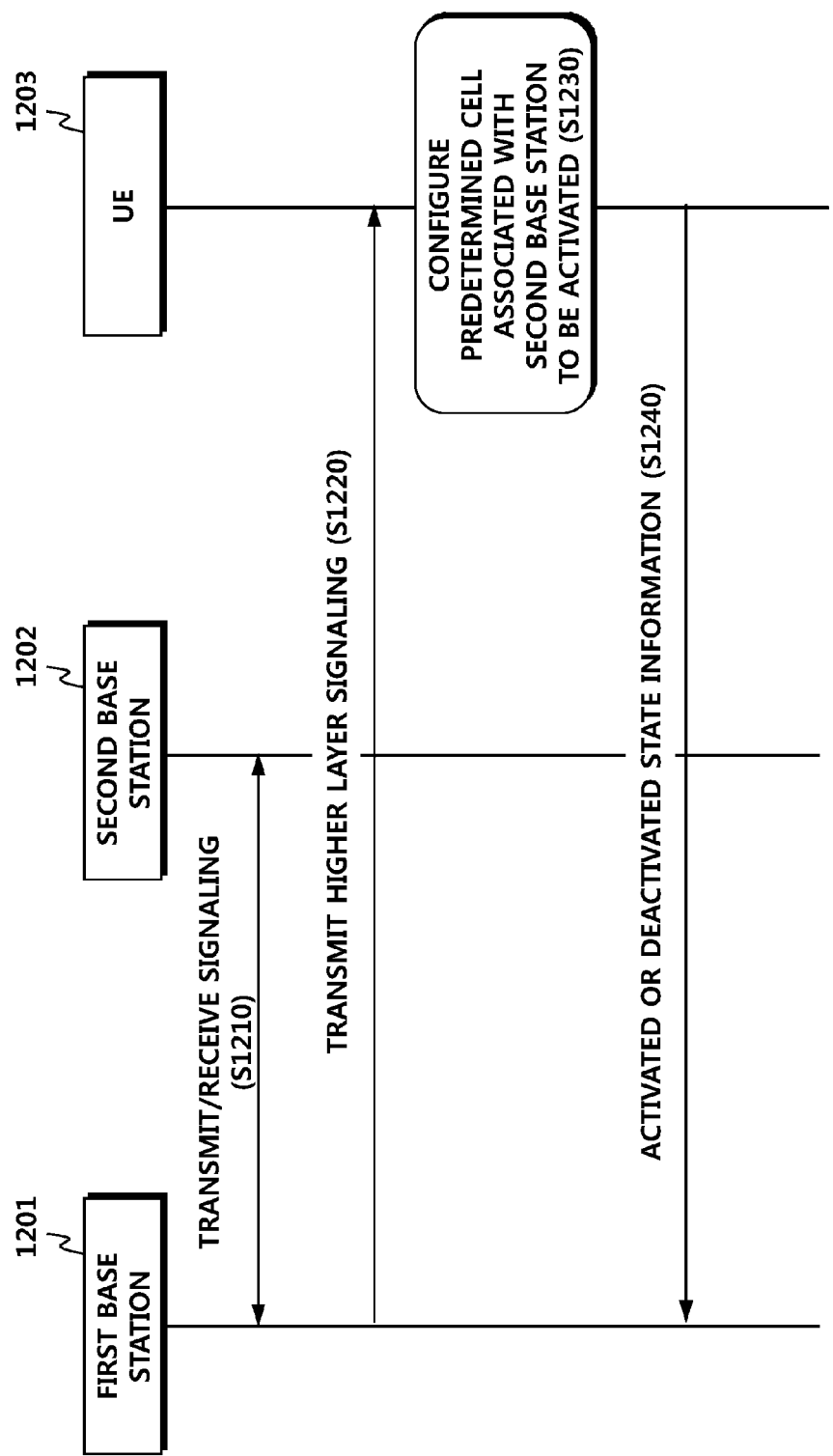
FIG. 12 is a diagram illustrating a procedure in which a first BS controls activation/deactivation of a cell associated with a second BS according to another embodiment of the present invention.

FIG. 12 is a diagram illustrating a procedure in which a first BS 1201 controls activation/deactivation of a cell associated with a second BS 1202 according to another embodiment of the present invention.

A method for a first BS to activate or deactivate a second BS-associated cell, according to an embodiment of the present invention, includes transmitting, to a UE, a higher layer signaling including addition/modification configuration information of a second BS-associated cell and addition/modification configuration of a radio bearer of the second BS, after signaling between the first BS and the second BS, and receiving activated or deactivated state information of a second BS-associated cell.

Referring to FIG. 12, the first BS 1201 according to another embodiment of the present invention executes a signaling procedure with the second BS 1202 in step S1210.

The signaling between the first BS 1201 and the second BS 1202 may configure cell index information by distinguishing a cell associated with the first BS 1201 and a cell associated with the second BS 1202.

The first BS 1201 transmits a higher layer signaling to a UE 1203 in step S1220. The higher layer signaling may include addition/modification configuration information of a cell associated with the second BS 1202 and addition/modification configuration information of a radio bearer of the second BS 1202, as described with reference to FIGS. 5 and 6.

The UE 1203 may add/modify a second BS-associated cell based on the higher layer signaling and configure at least one predetermined cell from among second BS-associated cells to be activated. Also, the UE 1203 configures a radio bearer through the second BS 1202 in step S1230.

The UE 1203 transmits information associated with an activated or deactivated state of the added/modified cell associated with the second BS 1202, to the first BS 1202 in step S1240.

The method for a first BS to activate a second BS-associated cell has been described according to an embodiment of the present invention, which has been described with reference to FIGS. 5 and 6. Hereinafter, operations of the first BS according to another embodiment of the present invention, which has been described with reference to FIGS. 7 to 10, will be described.

Figure 13:
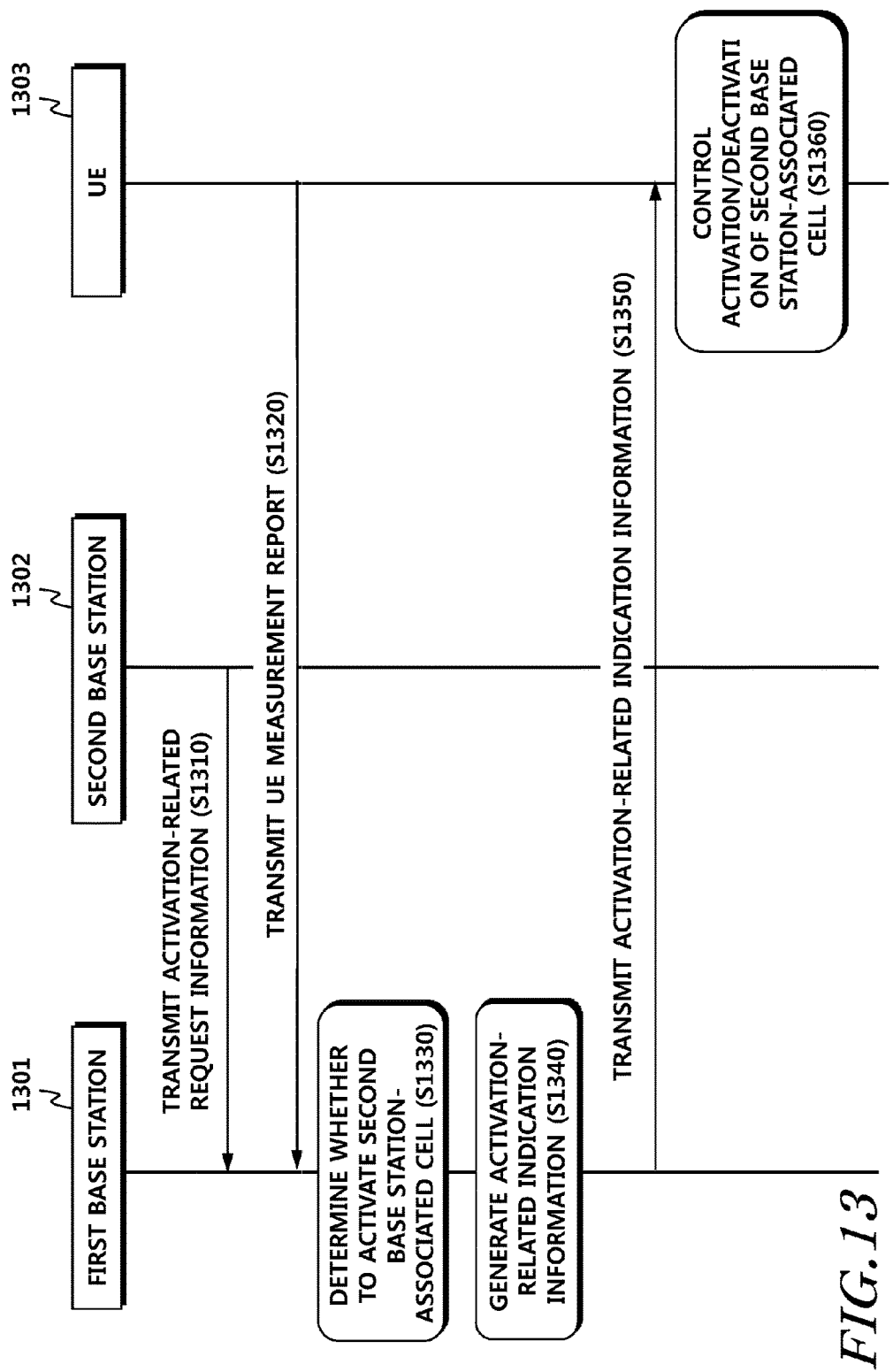
FIG. 13 is a diagram illustrating a procedure in which a first BS activates a cell associated with a second BS according to another embodiment of the present invention.

FIG. 13 is a diagram illustrating a procedure in which a first BS 1301 activates a cell associated with a second BS 1302 according to another embodiment of the present invention.

A method for a first BS 1301 to activate or deactivate a second BS-associated cell, which is added as a serving cell for a UE 1303, according to an embodiment of the present invention, may include determining activation or deactivation of the second BS-associated cell added for the UE 1303, based on one of activation related request information, a UE measurement report, and data state information, and transmitting, to the UE 1303, activation-related indication information including information indicating activation or deactivation of a second BS-associated cell.

As described above, the activation-related indication information may be included in a Media Access Control (MAC) signaling or a higher layer signaling for transmission, and the MAC signaling may include a MAC control element and/or MAC header, which includes a field indicating whether to activate a second BS-associated cell (in the case of the first embodiment).

Referring to FIG. 13, the first BS 1301 determines whether to activate or deactivate a second BS-associated cell added for the UE 1303, based on at least one of activation-related request information, a UE measurement report, and data state information in step S1330.

The first BS 1303 may receive from the second BS 1302 activation-related request information requesting activation or deactivation of a second BS-association cell in step S1310. Alternatively, the first BS 1301 may receive a UE measurement report including information associated with a signal state measured by the UE and the like from the UE 1303 in step S1320. Alternatively, without steps S1310 and S1320, the first BS 1301 may determine data state information of the UE 1303 and may determine whether to activate a second BS-associated cell.

Each case will be described in detail. The first BS 1301 may receive an activation-related request message for activating a second BS-associated cell based on a data state of the second BS 1302 from the second BS 1302.

In another embodiment, the first BS 1301 may determine whether to activate a second BS-associated cell based on data state information forwarded from the first BS 1301 to the second BS 1302.

In another embodiment, the first BS 1301 may determine whether to activate a second BS-associated cell based on a measurement report of the UE 1303.

Therefore, one or both of steps S1310 and S1320 may not be executed irrespective of a sequence.

Subsequently, the first BS 1301 generates activation-related indication information to be transmitted to the UE 1303 based on a result of determining whether to execute activation in step S1340. The UE 1303 receives the activation-related indication information from the first BS 1301 in step S1350, and controls activation or deactivation of a second BS-associated cell based on indication information included in the activation-related indication information in step S1360.

For example, the first BS 1303 may transmit the activation-related indication information through a MAC signaling or a higher layer signaling.

Detailed operations in which the first BS 1301 transmits activation-related indication information through a MAC signaling or a higher layer signaling has been described with reference to FIGS. 5 to 9.

Figure 14:
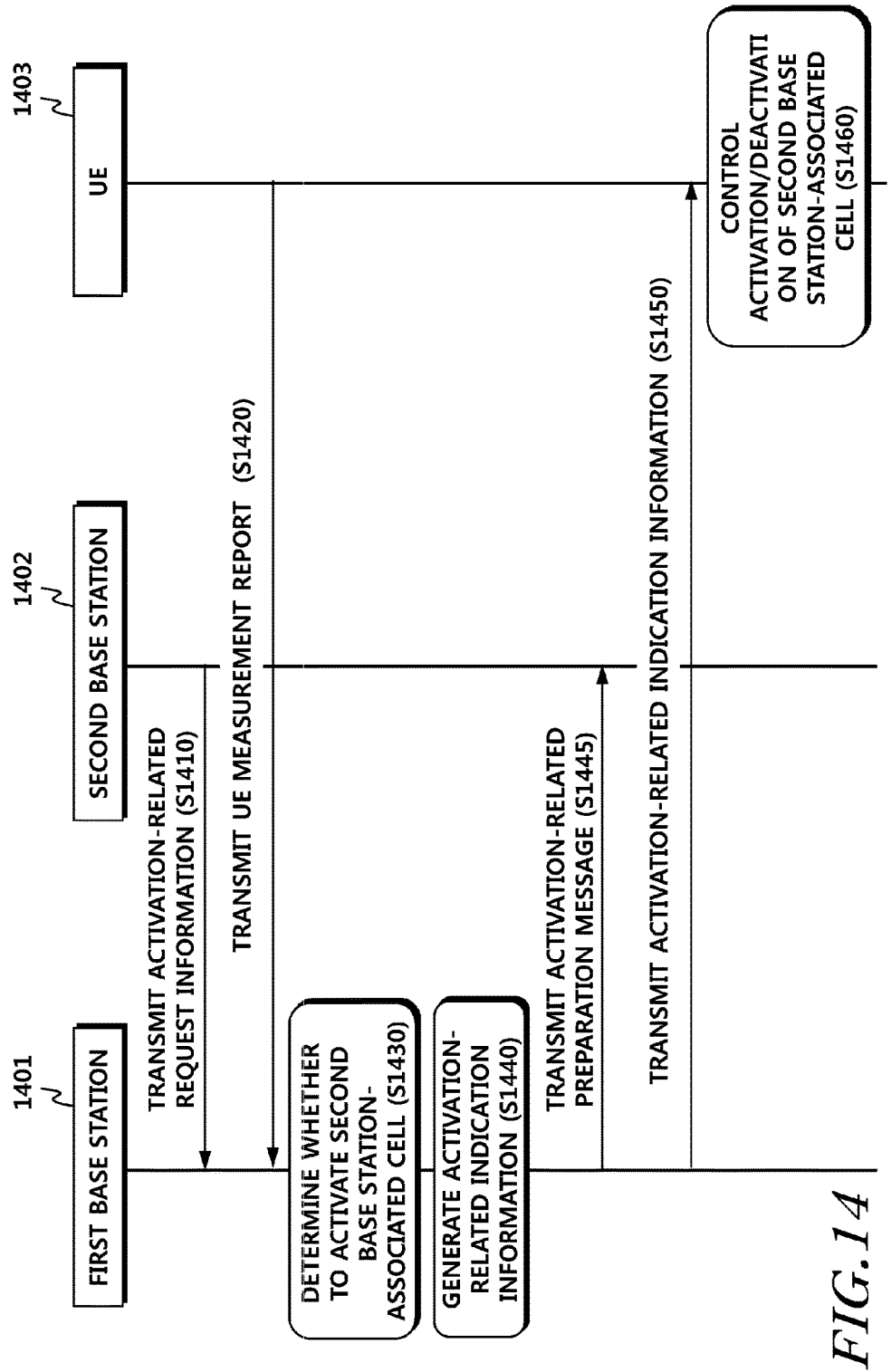
FIG. 14 is a diagram illustrating a procedure of activating a cell associated with a second BS, which includes an operation in which a first BS transmits an activation-related preparation message, according to another embodiment of the present invention.

FIG. 14 is a diagram illustrating a procedure of activating a cell associated with a second BS, which includes an operation in which a first BS transmits an activation-related preparation message, according to another embodiment of the present invention.

A method of a first BS 1401 according to another embodiment of the present invention may further include an operation of transmitting an activation-related preparation message to a second BS 1402 that provides a second BS-associated cell before transmitting activation-related indication information, so that the second BS 1402 prepares activation or deactivation of a second BS-associated cell in step S1445.

Referring to FIG. 14, the first BS 1401 determines whether to activate a second BS-associated cell based on at least one of activation-related request information, a UE measurement report, and data state information as described with reference FIG. 10 in step S1430.

The first BS 1401 generates activation-related indication information in step S1440, and transmits an activation-related preparation message to the second BS 1402 that provides a second BS-associated cell in step S1445.

That is, the first BS 1401 transmits to the second BS 1402 the activation-related preparation message that enables the second BS 1402 to prepare activation of a second BS-associated cell in step S1445. For example, the second BS 1402 proceeds with a process of preparing activation or deactivation of a second BS-associated cell provided by the second BS 1402 based on the received activation-related preparation message.

Figure 15:
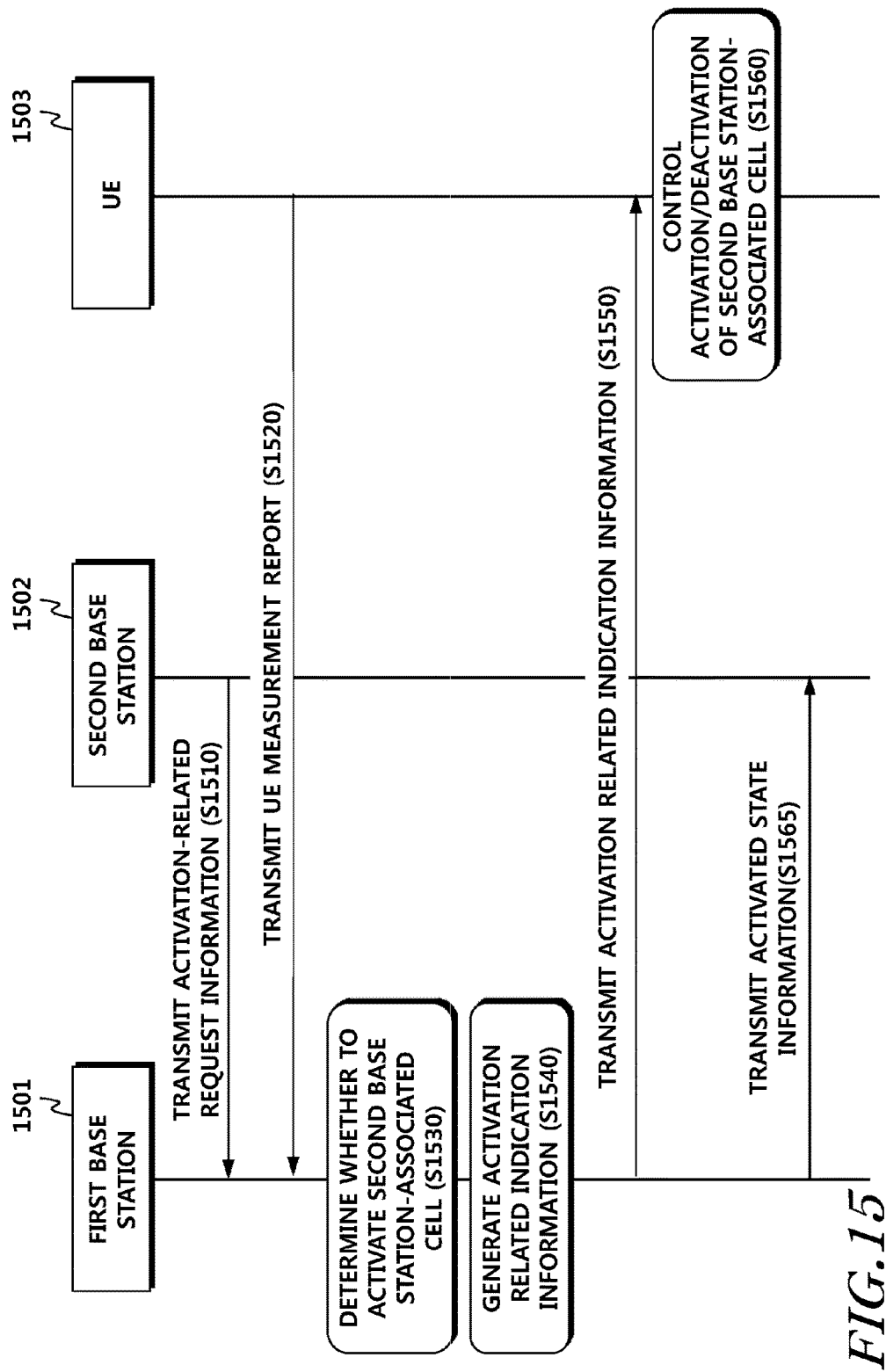
FIG. 15 is a diagram illustrating a procedure of activating a cell associated with a second BS, which includes an operation in which a first BS transmits activated state information, according to another embodiment of the present invention.

FIG. 15 is a diagram illustrating a procedure of activating a cell associated with a second BS 1502, which includes an operation in which a first BS 1501 transmits activated state information, according to another embodiment of the present invention.

A method of the first BS 1501 according to another embodiment of the present invention may further include an operation of transmitting a message including activated state information of UE 1503 to the second BS 1502 that provides a second BS-associated cell, after transmitting activation-related indication information.

That is, the first BS 1501 may transfer to the second BS 1502 an activated state information message reporting that a second BS-associated cell is activated or deactivated.

Referring to FIG. 15, the first BS 1501 determines whether to activate a second BS-associated cell based on at least one of activation-related request information, a UE measurement report, and data state information in step S1530.

Subsequently, the first BS 1501 generates activation-related indication information in step S1540, and transmits the generated activation-related indication information to the UE 1503 in step S1550.

The UE 1503 activates or deactivates a second BS-associated cell based on the activation-related indication information in step S1560.

The first BS 1501 may transmit an activated state information message including information associated with an activated state of a second BS-associated cell provided by the second BS 1502 from among second BS-associated cells configured for the UE 1503 to the second BS 1502 that provides a second BS-associated cell in step S1565. Step S1565 may be executed before step S1560, may be executed in parallel with step S1560, or may be executed after step S1560 as shown in FIG. 15.

The steps of the first BS 1501 have been described in detail in the previously detailed embodiments.

Hereinafter, operations of a UE and a BS will be described in association with another embodiment for a UE to activate or deactivate an added second BS-associated cell.

Method of Using a MAC Signaling Through a Second BS

Figure 16:
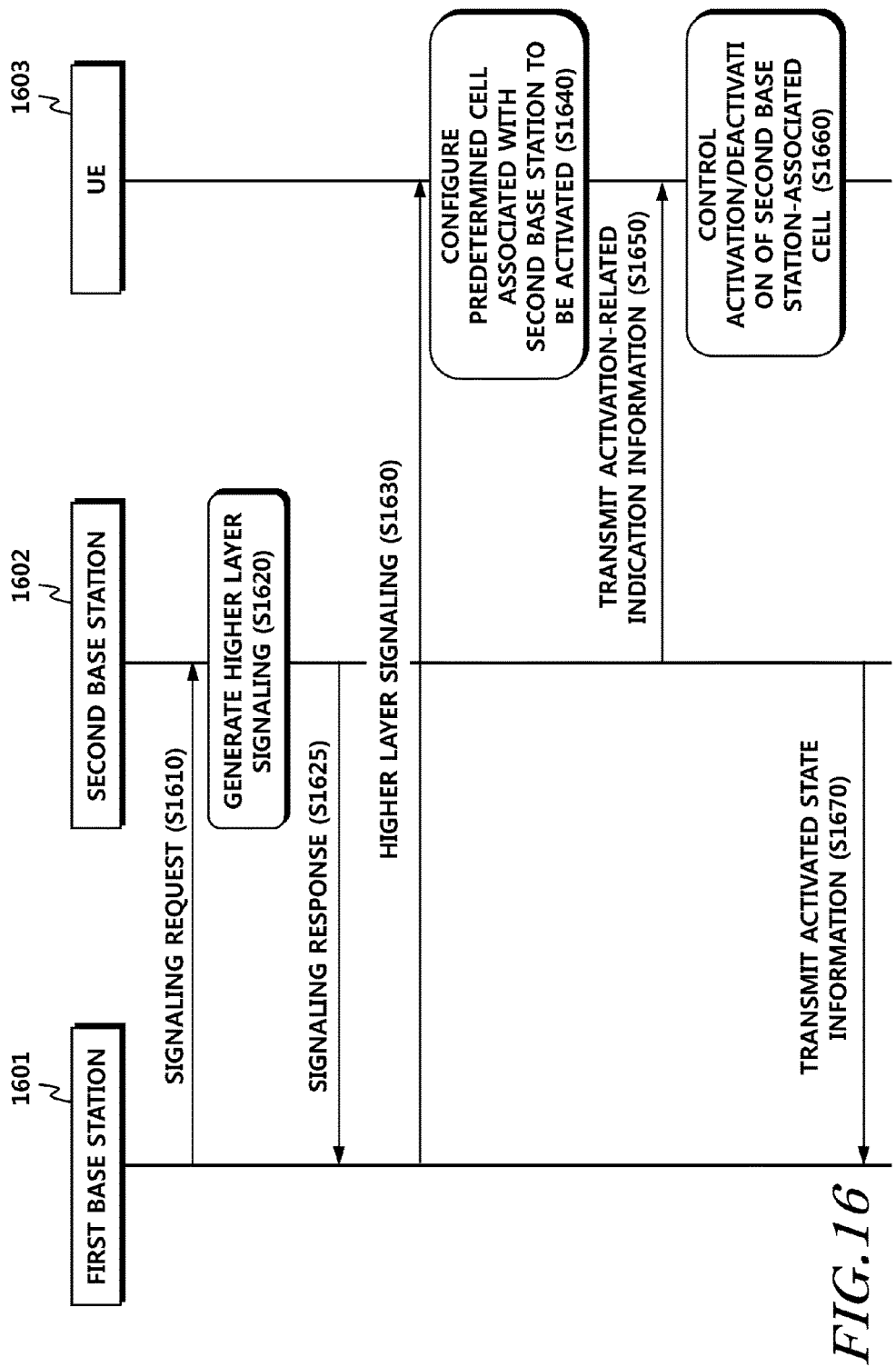
FIG. 16 is a diagram illustrating a procedure in which a second BS controls activation/deactivation of a cell associated with a second BS according to another embodiment of the present invention.

FIG. 16 is a diagram illustrating a procedure in which a second BS 1602 controls activation/deactivation of a cell associated with the second BS 1602 according to another embodiment of the present invention.

A method for the second BS 1602 to activate or deactivate a second BS-associated cell according to another embodiment of the present invention may include generating a higher layer signaling to be transmitted from the second BS 1602 to a UE 1603 through a first BS 1601 in a signaling process between the first BS 1601 and the second BS 1602, transmitting activation-related indication information including information indicating activation or deactivation of a second BS-associated cell to the UE 1603 through a second BS-associated cell, and transmitting activated or deactivated state information of a second BS-associated cell to the first BS 1601.

Referring to FIG. 16, the second BS 1602 transmits and receives a signaling to/from the first BS 1601. For example, the first BS 1601 transmits a signaling request to the second BS 1602 in step S1610. The second BS 1602 generates a higher layer signaling in step S1620, and then transmits a signaling response to the first BS 1601 in step S1625.

The signaling between the first BS 1602 and the second BS 1601 may configure cell index information by distinguishing a cell associated with the first BS 1601 and a cell associated with the second BS 1602.

The second BS 1602 generates a higher layer signaling to be transmitted to the UE 1603 through the first BS 1601 in step S1620. The generated higher layer signaling may be transmitted to the UE 1603 through the first BS 1601 as described with reference to FIGS. 5 and 6 in step S1630.

The UE 1603 activates or deactivates a predetermined cell associated with the second BS 1602 based on the higher layer signaling in step S1640. As described with reference to FIGS. 5 and 6, when a plurality of second BS-associated cells exists at least one predetermined cell is configured to be activated.

Subsequently, the second BS 1602 transmits activation-related indication information to the UE 1603 in step S1650. The activation-related indication information may include information indicating activation or deactivation of a cell distinguished from a predetermined cell configured to be activated from among second BS-associated cells.

Also, the activation-related indication information may be transmitted by being included in a MAC signaling, and may include at least one of a MAC control element and a MAC header, which includes a field indicating whether to activate a second BS-associated cell.

The second BS 1602 transmits activated or deactivated state information of a second BS-associated cell to the first BS 1601 in step S1670.

The method for the second BS 1602 to control whether to activate a second BS-associated cell has been described with reference to FIG. 16. Hereinafter, another embodiment for a second BS 1702 to control whether to activate a second BS-associated cell will be described in detail with reference to FIG. 17.

Portion of the method described with reference FIG. 17 may be similar or identical to the method described with reference to FIG. 16, or may include further detailed steps.

Figure 17:
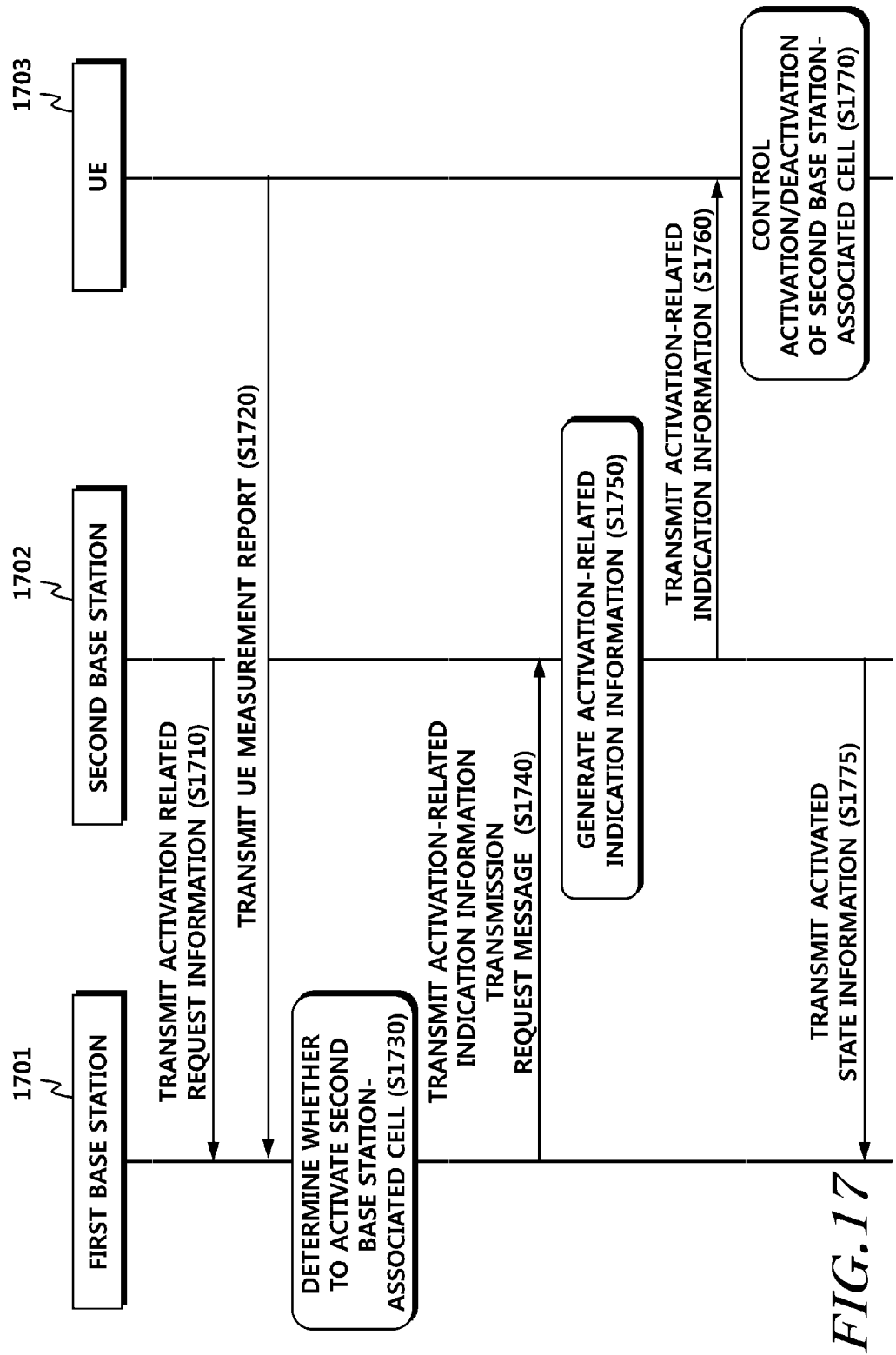
FIG. 17 is a diagram illustrating a procedure in which a second BS activates a cell associated with a second BS according to another embodiment of the present invention.

FIG. 17 is a diagram illustrating a procedure in which a second BS 1702 activates a cell associated with the second BS according to another embodiment of the present invention.

A method for the second BS 1702 to control activation or deactivation of a second BS-associated cell added as a serving cell for a UE 1703 according to another embodiment of the present invention may include receiving an activation-related indication information transmission request message from a first BS 1701 that provides a macro cell, and transmitting to the UE 1703 activation-related indication information including information indicating activation or deactivation of a second BS-associated cell based on the activation-related indication information transmission request message.

The activation-related indication information according to another embodiment of the present invention may be transmitted by being included in a Media Access Control (MAC) signaling, and the MAC signaling may include a MAC control element and/or MAC (sub)header, which includes a field that identifies a second BS-associated cell and indicates whether to activate the cell or not.

The method of the second BS 1702 according to another embodiment of the present invention may further include an operation of transmitting a message including activated state information of the UE 1703 to the first BS 1701 after transmitting the activation-related indication information.

Each operation will be described in detail with reference to FIG. 17.

The first BS 1701 determines whether to activate a second BS-associated cell as described with reference to FIGS. 13 to 15 in step S1730. In this instance, the first BS 1701 receives activation-related request information from the second BS 1702 in step S1710, or receives a UE measurement report from the UE 1703 in step S1720. Alternatively, as described above, the determination may be made based on only data state information. For example, in the case where a radio bearer that uses both the first BS 1701 and the second BS 1702 is configured, when retransmission frequently occurs in a RLC entity configured for the second BS due to a load of the second BS, radio quality deterioration, and the like, or when consecutive problems are acknowledged in a physical layer (for example, N311 consecutive "in-sync" indications), the second BS 1702 requests deactivation from the first BS 1701 or may directly transmit deactivation indication information to the UE 1703 based on the determination of the second BS 1702.

When the first BS 1701 determines whether to activate a second BS-associated cell, the second BS 1702 receives a transmission request message that requests transmission of activation-related indication information from the first BS 1701 in step S1740.

The first BS 1701 may transmit a request message for requesting activation or deactivation of a second BS-associated cell to the second BS 1702 based on a data state transferred from the first BS 1701 to the second BS 1702.

In another embodiment, the first BS 1701 may transmit a request message for requesting activation or deactivation of a second BS-associated cell to the second BS 1702, based on a measurement report from the UE 1703.

The second BS 1702 according to the present invention receives the activation-related indication information transmission request message, and generates activation-related indication information based on the message, in step S1750.

Subsequently, the second BS 1702 transmits the activation-related indication information to the UE 1703 in step S1760. Particularly, the second BS 1702 may include the activation-related indication information in a Media Access Control (MAC) signaling, and transmit the same through a predetermined cell associated with the second BS 1702, which is activated in the second BS 1702. Alternatively, second BS 1702 may include the activation-related indication information in a MAC signaling and transmit the same through a predetermined cell associated with the second BS 1702, which is activated in the second BS 1702 and is to transfer indication information indicating activation or deactivation of a second BS-associated cell.

The MAC signaling may include a MAC control element and/or MAC (sub) header, which includes a field indicating whether to activate a second BS-associated cell.

The MAC control element that includes the activation-related indication information transmitted from the second BS 1702 may be identified by a MAC Protocol Data Unit (PDU) subheader that has a logical channel ID (LCID) as described with reference to FIG. 11.

A MAC control element may be formed as a single octet including seven C-fields and a single R-field.

When a second BS-associated cell configured based on an SCell index (SCellindex) or a second BS-associated cell index i exists, this field may indicate activation of the SCell or the second BS-associated cell, which has the SCell index i the second BS-associated cell index i.

Alternatively, when a second BS-associated cell configured as an SCell based on an SCell index i exists, this field may indicate activation of the second BS-associated cell having the SCell index i or the second BS-associated cell index i.

When the Ci field is set to "1", this indicates that a corresponding SCell or a corresponding second BS-associated cell should be activated. When the Ci is set to "0", this indicates that a corresponding SCell or a corresponding second BS-associated cell should be deactivated.

In another embodiment, when the above described second BS-associated cell is configured activation/deactivation of the second BS-associated cell may be indicated by the R field.

When the R field is set to "1", this may indicate that the second BS-associated cell is activated. When the R field is set to "0", this may indicate that the second BS-associated cell is deactivated. When a second BS-associated cell is added under a control of a macro cell or through cooperation with a macro cell, and activation/deactivation is distinguished using the R field, the above described second BS-associated cell index or SCell index may not be used, or a value (for example, C8) that is different from a value (for example, C1-C7) that is used for an SCell index of a first BS may be added and used. As another example of indicating activation/deactivation of a second BS-associated cell using the R field, when the R field 1108 is set to "1", a Ci field indicates that a secondary cell (small cell) of a second BS, which has a secondary cell index i, should be activated ("1")/deactivated ("0"), and when the R field 1108 is set to "0", the Ci field indicates that a secondary cell of a first BS, which has a secondary cell index i, should be activated/deactivated. As another example, one of the Ci fields (for example, C6 or C7) is designated to distinguish secondary cells of the first BS and secondary cells of the second BS, and when the predetermined Ci field (for example, C6 or C7) is set to "1", the other Ci fields (for example, C1, C2, C3, C4, and C5) indicate that a secondary cell (small cell) of the second BS, which has a secondary cell index i should be activated ("1")/deactivated ("0"), and when the predetermined Ci field (for example, C6 or C7) is set to "0", the other Ci fields (for example, C1, C2, C3, C4, and C5) may indicate that a secondary cell of a master BS, which has a secondary cell index i should be activated/deactivated.

In another embodiment, when the above described second BS-associated cell is configured a value for a logical channel ID (LCID) included in a MAC PDU subheader for identifying an activation/deactivation MAC control element with respect to secondary cells of the second BS, may be used, which is different from the LCID value 11011 for identifying an activation/deactivation MAC control element with respect to secondary cells of the first BS 1701, so that a UE 1703 distinguishes secondary cells of the first BS 1701 and secondary cells of the second BS 1702.

As described above, when the second BS 1702 transmits the activation-related indication information to the UE 1703, the UE 1703 activates or deactivates a corresponding second BS-associated cell based on the activation-related indication information in step S1770.

After transmitting the activation-related indication information, second BS 1702 may further include an operation of transmitting a message including activated state information of UE 1703 to the first BS 1701 in step S1775.

That is, the second BS 1702 may transmit the activation-related indication information to the UE 1703 and transmit to the first BS 1701 activated state information of a second BS-associated cell, which is provided from the second BS 1702 to the UE 1703.

The first BS 1701 may receive the corresponding information from the second BS 1702 and obtain information associated with an activated or deactivated state of a second BS-associated cell.

In another embodiment, the UE 1703 may transmit the information associated with an activated or deactivated state of the second BS-associated cell to the first BS 1701.

As described with reference to FIGS. 16 and 17, a UE 1703 that receives indication information indicating activation or deactivation of a second BS-associated cell according to the embodiment of the present invention may activate or deactivate a second BS-associated cell as described with reference to FIGS. 5 to 10.

The UE 1703 maintains a second BS-associated cell deactivation timer with respect to a configured second BS-associated cell. Also, the UE 1703 may deactivate a second BS-associated cell that is associated with expiration of the timer. The second BS-associated cell deactivation timer may be configured by an RRC. A first BS 1701 may not quickly acknowledge information associated with an activated state of a second BS 1702 secondary cell due to a non-ideal backhaul delay between a master BS 1701 and the second BS 1702, and thus, the deactivation timer may define and configure a field that is different from a secondary cell deactivation timer (sCellDeactivationTimer-r10) of the first BS 1701.

When the UE 1703 receives a MAC CE that includes activation-related indication information indicating activation of a second BS-associated cell at a corresponding TTI, the UE 1703 may activate a second BS-associated cell at the corresponding TTI with respect to each TTI and each configured second BS-associated cell. In another embodiment, considering a non-ideal backhaul delay between the first BS 1701 and the second BS 1702, when the UE 1703 receives activation-related indication information that activates a second BS-associated cell at a corresponding TTI, the UE 1703 activates a second BS-associated cell at a TTI after a non-ideal backhaul delay between the first BS 1701 and the second BS 1702 from the corresponding TTI (or a TTI after two times the non-ideal backhaul delay between the first BS 1701 and the second BS 1702 from the corresponding TTI) with respect to each TTI and each configured second BS-associated cell. The backhaul delay may be configured by the first BS 1701 through a higher layer signaling.

That is, a normal second BS-associated cell operation (SRS transmission or CQI/PMI/RI/PTI measurement reporting from the corresponding second BS-associated cell, or PDCCH monitoring of and for the corresponding second BS-associated cell and the like) may be applied. The UE 1703 starts a second BS-associated cell deactivation timer associated with the second BS-associated cell. As described above, when the second BS-associated cell deactivation timer expires, the corresponding second BS-associated cell may be deactivated.

When a MAC CE including deactivation indication information is received, the UE 1703 deactivates a second BS-associated cell at a TTI, stops a second BS-associated cell deactivation timer, and removes (flushes) a HARQ buffer associated with the corresponding second BS-associated cell.

Alternatively, when the second BS-associated deactivation timer expires at a corresponding TTI, the UE 1703 deactivates a second BS-associated cell at the TTI, stops a second BS-associated cell deactivation timer, and removes (flushes) a HARQ buffer associated with the second BS-associated cell.

Alternatively, when the UE 1703 receives a higher layer signaling including handover command information, the UE 1703 configures a second BS-associated cell configured in a lower layer to be considered as a deactivated state.

That is, when the UE 1703 receives an RRC connection reconfiguration message including mobility control information from the first BS 1701, the UE 1703 configures a second BS-associated cell, which is configured as a second BS-associated cell or an SCell in a lower layer, to be considered as a deactivated state. The UE 1703 may maintain a second BS-associated cell to be deactivated until second BS-associated cell activation indication information is received.

Alternatively, while a small cell is activated, when a PDCCH for the small cell indicates UL grant or DL assignment, or when a PDCCH for a serving cell that schedules a small cell indicates UL grant or DL assignment, a second BS-associated cell deactivation timer that is associated with the small cell may be restarted.

The case in which a second BS-associated cell is added/modified for the UE 1703 according to the present invention has been described with reference to the drawings.

The present invention may be applied to the case where a second BS-associated cell is added/modified, and to the case where a Data Radio Bearer (DRB) for user plane data transmission is added/modified through a second BS 1701 for a UE 1703 together with the addition/modification of a second BS-associated cell. The second BS-associated cell addition/modification that is associated with a second BS 1702 and radio bearer addition/modification through the second BS 1702 may be provided through a single procedure. That is, when the first BS 1701 determines user data transmission through the second BS 1702, second BS-associated cell addition/modification associated with the second BS 1702 and/or a radio bearer of the second BS 1702 may be configured through signaling between the first BS 1701 and the second BS 1702. Hereinafter, a procedure in which the first BS 1701 determines user plane data transmission through the second BS 1702 and adds/modifies a data radio bearer according to the present invention, will be described.

When the first BS 1701 determines user plane data transmission through the second BS 1702 or through the first BS 1701 and the second BS 1702 (determines addition/modification of DRBs for the second BS 1702), the first BS 1701 transmits a message for requesting establishment of a bearer for transmitting user plane data to the second BS 1702. Alternatively, the first BS 1701 transmits a message for requesting establishment of a bearer for configuring the DRBs. The message that requests configuring a bearer for transmitting of user plane data through the second BS 1702 (a second BS bearer addition/modification request message or a second BS addition/modification request message) may include at least one of the following information.

message type: information for identifying a procedure type of a message. The message may be a message identical to a message for requesting second BS-associated cell addition/modification, and further including a request for addition/modification of a radio bearer of the second BS.

first BS UE X2AP ID: identification information assigned by the first BS second BS-associated cell ID: information associated with a E-UTRAN Cell Global Identifier (ECGI) of a second BS-associated cell and a second BS-associated cell PCI (Physical Cell ID)

UE context information

UE Security capabilities: Information associated with an algorithm supported for encryption and integrity security in a UE, an algorithm supported for encryption in a UE, or an algorithm supported for encryption of user plane data in a UE. In another embodiment, UE Security Capabilities information may not be included in the bearer configuration request message, but may be only managed by the first BS.

AS Security Information or AS Security Key: Encryption key ($K_{UPenc}$) information of user plane data in the second BS, or BS key (K BS) information for deriving an encryption key ($K_{UPenc}$) for user plane data in the second BS. For the above described value, a value identical to $K_{UPenc}$ of the first BS or the BS key (K BS) may be used. In another embodiment, when the first BS transmits user data through the second BS, or the second BS executes only RLC/MAC/PHY functions excluding a PDCP, AS Security Information or AS Security Key information may not be included.

UE Aggregate Maximum Bit Rate: An aggregation of maximum bit rates that are applied to all Non-GBR bearers per UE, which is defined as an uplink or downlink, and is a value provided to a first BS through an MME. In another embodiment, UE-AMBR information may not be included in a bearer configuration request message, but may be only managed by the first BS. (this may be applied when the first BS forwards user plane data through the second BS.)

UE Capability information: UE capability information (for example, single Tx/Rx or multi Tx/Rx) required for configuring radio resources for user data transmission through second BS from among UE capability information included in UE context information received through MME List of E-UTRAN Radio Access Bearers (E-RABs) to be setup through secondary BS (E-RABs To Be Setup List)

E-RABs setup item

E-RAB ID: information for identifying a radio access bearer for a UE

E-RAB Level QoS parameter: QCI, Allocation and Retention Priority, GBR QoS information, which are Quality of Service (QoS) information applied to an E-RAB GTP Tunnel Endpoint: Transport Layer Address which is an IP address of the first BS, and GTP TEID (Tunnel Endpoint ID) information, may be included as an endpoint of a bearer for user plane data transmission between the first BS and the second BS when user plane data is transmitted through an interface between the first BS and the second BS.

In another embodiment, when user plane data is transmitted through an interface between an S-GW and a second BS, Transport Layer Address which is an IP address of the S-GWB and GTP TEID (Tunnel Endpoint ID) may be included as an endpoint of a bearer between the S-GW and the second BS.

The second BS that receives a bearer configuration request message for transmitting user plane data or configuring DRBs from the first BS may transmit a message for responding to the bearer configuration request to the first BS. The message for responding to the bearer configuration request may include at least one of the following information.

message type: information for identifying a procedure type of a message. The message may be a message identical to a message for responding to a second BS-associated cell addition/modification request, and further including a request for addition/modification of a radio bearer of a second BS.

first BS UE X2AP ID: identification information assigned by the first BS second BS UE X2AP ID: identification information assigned by the second BS List of E-UTRAN Radio Access Bearers (E-RABs) admitted through secondary BS (E-RABs Admitted List)

E-RABs item for admitting

E-RAB ID: information for identifying a radio access bearer for a UE

GTP Tunnel Endpoint: When user plane data is transmitted through an interface between the first BS and the second BS, information associate with an endpoint of a bearer for transmitting user plane data between the first BS and the second BS may be included.

In another embodiment, when user plane data is transmitted through an interface between an S-GW and the second BS, a Transport Layer Address which is an IP address of the S-GW and GTP TEID (Tunnel Endpoint ID) may be included as an endpoint of a bearer between the S-GW and the second BS.

DRB ID: information associated with a DRB identifier

PDCP-Config: PDCP configuration information in another embodiment, when the first BS transmits user data through the second BS through a radio bearer that simultaneously uses radio resources of the first BS and the second BS, and the second BS executes only RLC/MAC/PHY functions excluding a PDCP, PDCP-CONFIG information may not be included.

PDCP-Config: RLC configuration information logicalChannelIdentity: information associated with a logical channel identifier logicalChannelConfig: information associated with logical channel configuration information E-RABs not admitted list selective dedicated-RACH preamble After completing a signaling procedure with the second BS in association with bearer configuration information for transmitting user plane data transmission or configuring DRBs (after receiving a message for responding to the bearer configuration request from the second BS), the first BS includes information associated with DRBs to be added/modified received from the second BS in an RRC connection reconfiguration message and transmits the same to the UE. The UE may add/modify DRBs with the second BSs for user plane data, may modify DRBs of the first BS to DRBs of the second BS, may add/modify DRBs that simultaneously use the radio resources of the first BS and the second BS, or may add/modify DRBs of the first BS as DRBs that simultaneously use the radio resources of the first BS and the second BS.

The information associated with DRBs to be added/modified may include at least one of the following information.

EPS-Beareridentity; an EPS bearer identifier, which includes information associated with E-RAB ID cell identifier: information associated with a PCI (Physical Cell ID) of a second BS-associated cell and an ARFCN (Absolute Radio Frequency Channel Number)

second BS-associated cell index, SCell index, or second BS index/identification information: Index/identification information for indicating that a DRB configured for a UE is a radio bearer through the second BS, or index/identification information for indicating that a DRB configured for a UE is a radio bearer that simultaneously uses the radio resources of the first BS and the second BS DRB-ID: information associated with DRB-ID received from the second BS PDCP-Config: information associated with PDCP-Config received from the second BS RLC-Config: information associated with RLC-Config received from the second BS logicalChannelIdentity: information associated with a logical channel identifier logicalChannelConfig: information associated with logical channel configuration information In another embodiment, after initiating a bearer configuration signaling procedure with the second BS in association with bearer configuration for transmitting user plane data or for configuring DRBs (after transmitting a bearer configuration request message to the second BS), the first BS may include information associated with DRBs to be added/modified in an RRC connection reconfiguration message and transmit the same to the UE. The UE may add/modify DRBs with the second BS for transmission of user plane data, or modify DRBs of the first BS to DRBs of the second BS.

The information associated with DRBs to be added/modified may include at least one of the following information.

EPS-Beareridentity: an EPS bearer identifier, which includes information associated with E-RAB ID cell identifier: information associated with a PCI (Physical Cell ID) of a second BS-associated cell and an ARFCN (Absolute Radio Frequency Channel Number)

second BS index: a second BS-associated cell index, an SCell index, or second BS index/identification information: Index/identification information for indicating that a DRB configured for a UE is a radio bearer through a second BS or index/identification information for indicating that a DRB configured for a UE is a radio bearer that simultaneously uses the radio resources of the first BS and the second BS DRB-ID: Information associated with DRB-ID that the first BS determines and transfers to the second BS PDCP-Config: information associated with PDCP-Config that the first BS determines and transfers to the second BS RLC-Config: information associated with RLC-Config that the first BS determines and transfers to the second BS logicalChannelIdentity: information associated with a logical channel identifier logicalChannelConfig: information associated with logical channel configuration information Alternatively, identification information for distinguishing a second BS-associated cell and a macro cell may be included in information associated with a DRB to be added/modified or information associated with a DRB to be cancelled. For example, when DRBs that were configured through the first BS are added/modified through the second BS, information associated with a DRB to be added/modified may include second BS identifier/index/identification information.

Also, information associated with a DRB to be cancelled in a macro cell and a macro cell identifier may be included in the information associated with the DRB to be cancelled (DRB-ToAddMod).

In another embodiment, a second BS-associated cell index, an SCell, or second BS index/identification information may be included in information associated with a DRB to be added/modified.

The parameters (PDCP configuration information, RLC configuration information, and MAC configuration information) included in the RRC connection reconfiguration message may be set based on an initial context setup request message received from an MME.

Information (E-RABs list) included in the initial context setup request message may be forwarded through the bearer configuration request message, and the second BS may set the parameters based on the information. The second BS may transmit the set parameter information to the first BS to include the same in a RRC connection reconfiguration message.

In another embodiment, the parameters PDCP configuration information, RLC configuration information, MAC configuration information) included in the RRC Connection Reconfiguration message may be determined by the first BS based on information (E-RABs list) included in an initial context setup request message received from an MME.

In another embodiment, the parameters included in a RRC connection reconfiguration message may be set by the first BS based on information included in the initial context setup request message received from the MME and a message for responding to the bearer configuration request from the second BS.

Additionally, the first BS may include cell identification information and radio resource configuration information of a cell in the RRC connection reconfiguration message and transmit the same, so that the UE executes synchronization with a second BS-associated cell, and accesses the second BS-associated cell through a Random Access Channel (RACH).

The radio resource configuration information of a small cell may include second BS-associated cell system information received through a message for responding to the bearer configuration request, a random access channel preamble, UE-specific configuration information for operations in a secondary cell (small cell), and the like.

Although it is described that information associated with small cell access is transmitted through a higher layer signaling, the information may be transmitted in a separate step from the higher layer signaling.

The UE receives the higher layer signaling (RRC connection reconfiguration message) including the radio resource configuration information of a small cell and executes synchronization with the second BS. When dedicated-random access channel preamble information is included, a random access procedure may be executed according to a "contention-free" procedure. Alternatively, when the dedicated-random access channel preamble is not included, the random access procedure may be executed according to a "contention-based" procedure.

In the case of the higher layer signaling (for example, RRC connection reconfiguration message), information associated with a small cell to be added/modified, information associated with DRBs to be added/modified, and information for synchronization and random access may be included in a single message or in separate messages, and may be transmitted.

Also, as described above, when the first BS determines a procedure of adding, modifying, or removing a second BS-associated cell, or adding, modifying, removing DRBs through the second BS for transmitting user plane data through the second BS, the first BS determines the procedure based on information (E-RAB level QoS parameter) included in a initial context setup request message received from the MME. A bearer configuration signaling for transmission of the user plane data to the second BS may be initiated by determining a DRB to be serviced through the first BS and a DRB to be serviced through the second BS. That is, the first BS may select an E-RAB to be transmitted through the second BS by taking into consideration a load of the first BS, measurement report information, and the like based on a QoS parameter (QCI, Allocation and Retention Priority, GBR QoS) for each E-RAB.

For example, a GBR bearer or an E-RAB having a predetermined QCI or predetermined allocation and retention priority value may be transmitted through the first BS, and may not request configuration of a DRB from the second BS.

When not admitted E-RABs exist in the bearer configuration response message, the first BS may configure DRBs through the first BS and transmit user data.

The first BS may execute the described DRBs addition/modification procedure when a second BS-associated cell is activated in a UE, or together with activation of a second BS-associated cell. For example, when the first BS transfers second BS-associated cell addition/modification information and second BS radio bearer addition/modification information to a UE through a higher layer signaling after signaling between the first BS and the second BS to transfer data through an added radio resource of the second BS that is distinguished from the first BS based on a UE measurement report, the UE configures a second BS-associated cell to be activated, and then adds/modifies DRBs through the second BS (or the first BS and the second BS) according to the received higher layer signaling. In the case of the UE before Release 11, when secondary cell addition/modification information and radio bearer addition/modification information are received, the UE configures a radio bearer for prompt communication, and then configures a secondary cell to be deactivated. Subsequently, the UE activates and uses a secondary cell based on a data state and the like. However, in the case where second BS-associated cell addition/modification information and radio bearer addition/modification information are received, it may be efficient when the UE configures a second BS-associated cell to be activated for prompt communication through the second BS, and then, configures a radio bearer for the second BS.

In another embodiment, second BS-associated cell activation/deactivation may be executed after executing the DRBs addition/modification procedure. For example, when DRBs are added, a radio bearer is configured first, and then a second BS-associated cell is configured to be deactivated, and the second BS-associated cell may be activated based on a data state of the second BS-associated cell. Alternatively, when DRBs are added, a second BS-associated cell is configured to be activated, and the second BS-associated cell that is associated with the second BS may be deactivated based on a data state of the second BS-associated cell or a second BS-associated cell deactivation timer.

In another embodiment, irrespective of the DRBs addition/modification procedure, a predetermined cell associated with a second BS may be configured to be always activated. For example, to transfer indication information indicating activation or deactivation of a second BS-associated cell, a predetermined cell associated the second BS may be configured to be activated until the predetermined cell is cancelled and/or a handover message is received. Alternatively, when a (single) cell associated with the second BS is added for the first time, the corresponding cell may be configured to be activated until the cell is cancelled and/or a handover message is received.

In another embodiment, a radio bearer (DRBs) for transmission of user plane data may be configured for one of secondary cells (small cells) included in the second BS, and a predetermined cell associated with the second BS may be configured to be always activated until the cell is cancelled and/or a handover message is received. The UE may configure at least one of secondary cells (small cells) of the second BS where a radio bearer (DRBs) is configured for transmission of user plane data to be always activated until the cell is cancelled and/or a handover message is received. For example, a significantly high value is used as a deactivation timer value, or the cell is always maintained as an activated state until the configuration of a new second BS-associated cell where a radio bearer (DRBs) for transmission of user plane data is configured or removal of all secondary cells of the second BS. A higher layer signaling message includes second BS radio bearer configuration information in secondary cell configuration information (RadioResourceConfigDedicatedSCell) to distinguish a predetermined cell of the second BS, which is to be maintained as an activated state and through which the UE to transfer indication information indicating activation or deactivation of a second BS-associated cell, includes a second BS secondary cell index for distinguishing the same, or includes predetermined cell indication information associated with a predetermined cell of the second BS, which is maintained to be activated and transfers indication information indicating activation or deactivation of a second BS-associated cell until the cell is cancelled and/or a handover message is received. Also, when a secondary cell is added without configuration of a radio bearer (DRBs) for transmission of user plane data with respect to other secondary cell(s) of the second BS, which are different from a second BS-associated cell that is configured to be always activated (radio bearer configuration information is not included when a second BS secondary cell is added), the UE configures the secondary cell to be deactivated, and the secondary cell may be activated/deactivated by the first BS or the second BS.

The operations of the UE, the first BS, and the second BS that have been described with reference to the above described embodiments of the present invention will be briefly described again.

A method for a UE to activate or deactivate a second BS-associated cell according to an embodiment of the present invention may include receiving a higher layer signaling that is received through a first BS after signaling between the first BS and a second BS. Configuring a predetermined cell associated with the second BS to be activated, and configuring a radio bearer through the second BS.

Also, the method for the UE according to another embodiment of the present invention may further include receiving activation-related indication information, including information indicating activation or deactivation of a cell that is different than a predetermined cell configured to be activated from among cells associated with the second BS through the second BS. Controlling activation or deactivation of the cell different than the predetermined cell configured to be activated from among cells associated with the second base station based on the activation-related indication information.

That is, as described with reference to FIGS. 5 and 6, the UE according to the present invention configures a second BS-associated cell based on a higher layer signaling received from the first BS, and at least one predetermined cell may be configured to be activated.

Also, upon receiving the activation-related indication information from the second BS, the UE may control activation or deactivation of the cell which is different than the predetermined cell configured to be activated from among configured second BS-associated cells. The detailed procedure are described with reference to FIGS. 5 and 6.

In another embodiment, in the case where the UE adds a second BS-associated cell as a serving cell, the method of activating or deactivating the second BS-associated cell according to another embodiment of the present invention may include receiving activation-related indication information, including information indicating activation or deactivation of a second BS-associated cell from one of a first BS that provides a macro cell and a second BS that provides a second BS-associated cell.

As described above, the UE may receive the activation-related indication information from the first BS through a MAC signaling or a higher layer signaling. Also, the UE may receive the activation-related indication information from the second BS through a MAC signaling.

Also, the MAC signaling may include a MAC control element and/or MAC (sub) header, which includes a field indicating whether to activate a second BS-associated cell.

Subsequently, the method of the UE according to an embodiment of the present invention may include controlling activation or deactivation of a second BS-associated cell based on the activation-related indication information.

As described above, the UE may activate or deactivate a corresponding second BS-associated cell based on information included in the activation-related indication information.

Particularly, as described with reference to FIGS. 7 to 11, the UE may activate a second BS-associated cell and start a second BS-associated cell deactivation timer. Alternatively, the UE may deactivate a second BS-associated cell, stop a second BS-associated cell deactivation timer, and remove a HARQ.

In addition, the UE may execute operations required for implementing the present invention as described with reference to FIGS. 5 to 17.

A method for a first BS to activate or deactivate a second BS-associated cell according to another embodiment of the present invention includes transmitting to a UE a higher layer signaling including addition/modification configuration information of a second BS-associated cell and addition/modification configuration of a radio bearer of the second BS, after signaling between the first BS and the second BS. Receiving activated or deactivated state information of a second BS-associated cell.

That is, the first BS transmits second BS-associated cell addition/modification configuration information and second BS radio bearer addition/modification information to the UE, and the UE may add/modify a second BS-associated cell, based on the information. Also, a radio bearer associated with the second BS may be added/modified.

Also, the first BS may receive from the UE or the second BS state information including information associated with an activated or deactivated state of the second BS-associated cell.

In another embodiment, a method for a first BS to control activation or deactivation of a second BS-associated cell added as a serving cell for a UE, according to the present invention, may include determining activation or deactivation of a second BS-associated cell added for the UE based on at least one of activation-related request information, a UE measurement report, and data state information.

As described above, the first BS may make the determination by receiving second BS-associated cell activation-related request information from the second BS, or based on a UE measurement report received from the UE. Also, whether to activate a second BS-associated cell may be determined based on data state information.

The method of the first BS according to the present invention may further include transmitting an activation-related preparation message to the second BS that provides a second BS-associated cell before transmitting activation-related indication information, so that the second BS prepares activation or deactivation of a second BS-associated cell.

Also, the method of the first BS according to the present invention includes transmitting to the UE the activation-related indication information including information indicating activation or deactivation of a second BS-associated cell.

Particularly, as described above, the first BS may transmit the activation-related indication information through a MAC signaling or a higher layer signaling.

Also, the method of first BS according to the present invention may further include transmitting an activation-related preparation message to the second BS that provides a second BS-associated cell before transmitting the activation-related indication information, so that the second BS prepares activation or deactivation of a second BS-associated cell.

Also, the method of the first BS according to the present invention may further include transmitting a message including activated state information of the UE to the second BS that provides a second BS-associated cell after transmitting the activation-related indication information.

Also, the method of the first BS according to the present invention may further include transmitting an activation-related indication information transmission request message that requests transmission of activation-related indication information to the second BS that provides a second BS-associated cell after determining activation or deactivation of the second BS-associated cell.

In this instance, the activation-related indication information may be transmitted from the second BS to the UE.

A method for a second BS to activate or deactivate a second BS-associated cell, according to another embodiment of the present invention, may include generating a higher layer signaling to be transmitted to a UE through a first BS after signaling between the first BS and the second BS. Transmitting activation-related indication information including information indicating activation or deactivation of a second BS-associated cell through a second BS-associated cell to the UE, and transmitting activated or deactivated state information of a second BS-associated cell to the first BS.

That is, the second BS generates a higher layer signaling including addition/modification configuration information of a second BS-associated cell, addition/modification configuration information of a radio bearer of a second BS-associated cell, and transmits the same to the UE through the first BS. In this instance, the second BS transfers the generated higher layer signaling information to the first BS, and the first BS transmits the received information to the UE through a higher layer signaling.

Also, the second BS generates activation-related indication information for controlling activation or deactivation of a second BS-associated cell configured for the UE.

Subsequently, the second BS transmits to the first BS state information associated with an activated or deactivated state of a second BS-associated cell configured for the UE.

In another embodiment, the method for the second BS to activate or deactivate a second BS associated cell added as a serving cell for the UE, according to the present invention, may include receiving an activation-related indication information transmission request message from the first BS that provides a macro cell.

Also, the method of the second BS according to the present invention may include transmitting to the UE activation-related indication information including information indicating activation or deactivation of a second BS-associated cell based on the activation related indication information transmission request message.

In this instance, the second BS may transmit the activation-related indication information by including the same in a MAC signaling.

Also, the method of the second BS according to the present invention may further include transmitting a message including activated state information of the UE to the first BS after transmitting the activation-related indication information.

The above described UE, the first BS, and the second BS may execute all the operations described with reference to FIGS. 5 to 17.

The above described present invention will be described from the perspective of the configurations of a BS and a UE with reference to FIGS. 18 and 19.

The method of the present invention which has been described with reference to FIGS. 5 to 17 may be implemented by a BS and a UE to be described below.

Figure 18:
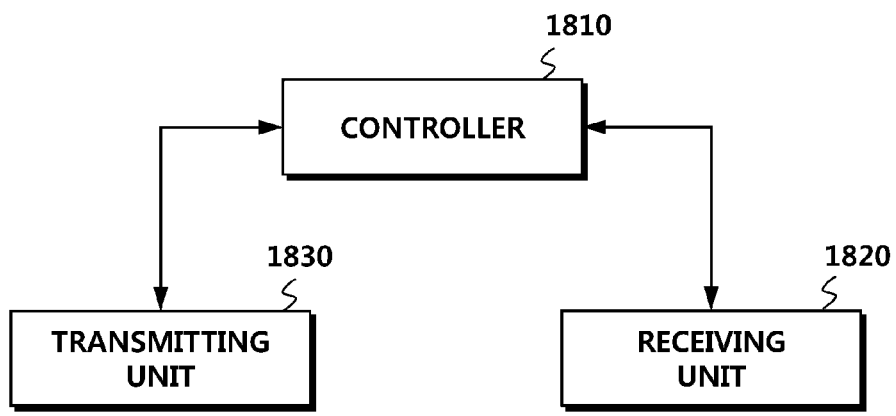
FIG. 18 is a block diagram illustrating a configuration of a UE according to another embodiment of the present invention.

FIG. 18 is a block diagram illustrating a configuration of a UE according to embodiment of the present invention.

Referring to FIG. 18, a UE 1800 according to an embodiment of the present invention includes a receiving unit 1820, a controller 1810, and a transmitting unit 1830.

The receiving unit 1820 may receive from a BS, downlink control information, downlink data, and a message through a corresponding channel.

Also, the receiving unit 1820 may receive a higher layer signaling from a first BS (not shown), and the higher layer signaling may include second BS-associated cell addition/modification configuration information. As described above, the second BS-associated cell addition/modification configuration information may include cell information associated with a cell to which activation or deactivation indication information of a second BS-associated cell is to be transferred or cell information associated with a cell to be maintained as an activated state.

The receiving unit 1820 receives activation-related indication information from a second BS (not shown).

According to another embodiment of the present invention, the receiving unit 1820 may receive a MAC signaling or a higher layer signaling, which includes activation-related indication information from the first BS or the second BS. Also, the receiving unit 1820 may receive a higher layer signaling including handover command information.

The controller 1810 may control general operations of a UE (not shown) required when the UE controls activation or deactivation of a second BS-associated cell for implementing the present invention.

The controller 1810 configures a predetermined cell associated with the second BS to be activated, based on a higher layer signaling, and may configure a radio bearer. Also, based on the received activation-related indication information, the controller 1810 may execute a control to activate or deactivate a second BS-associated cell. According to another embodiment of the present invention, the controller 1810 activates/deactivates the corresponding second BS-associated cell based on the received activation-related indication information, stops a second BS-associated cell activation/deactivation timer, and removes a HARQ.

In addition, the controller 1810 may control the general operations of the UE that have been described with reference to FIGS. 5 to 17.

The transmitting unit 1830 transmits to a BS uplink control information, data, and a message through a corresponding channel.

Also, the transmitter 1830 may communicate with the second BS, or may transmit activated or deactivated state information of a second BS-associated cell to the first BS.

Figure 19:
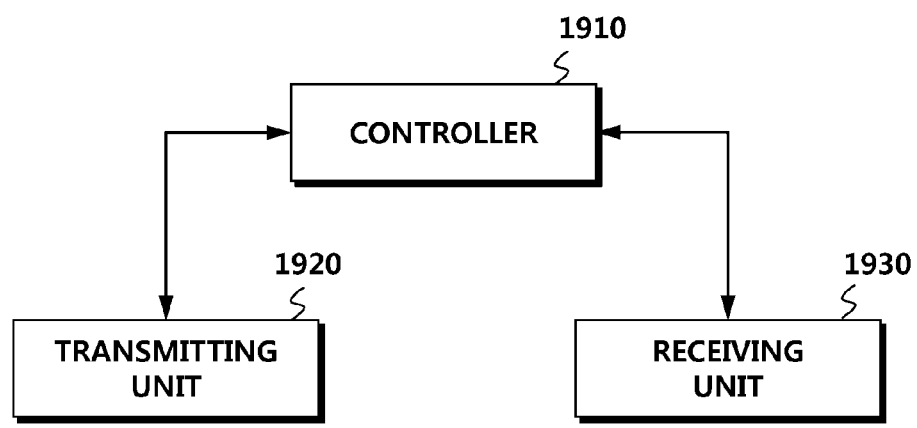
FIG. 19 is a block diagram illustrating a configuration of a BS according to another embodiment of the present invention.

FIG. 19 is a block diagram illustrating a configuration of a BS 1900 according to an embodiment of the present invention.

Referring to FIG. 19, a base station 1900 includes a controller 1910, a transmitting unit 1920, and a receiving unit 1930.

First, a first BS 1900 according to an embodiment of the present invention will be described.

The controller 1910 may control general operations of a BS in association with determining whether to activate a second BS-associated cell and transmitting a higher layer signaling or activation-related indication information, which are required for implementing the present invention.

The transmitting unit 1920 and the receiving unit 1930 may be used for transmitting and receiving a signal or a message and data required for implementing the above described present invention to/from a UE.

The transmitting unit 1920 may transmit a higher layer signaling including second BS-associated cell addition/modification configuration information to the UE.

According to another embodiment of the present invention, the transmitting unit 1920 may transmit activation-related indication information, and the information may be transmitted through a MAC signaling or a higher layer signaling.

Also, the receiving unit 1930 may receive from the UE or a second BS state information including information associated with an activated or deactivated state of the second BS-associated cell.

According to another embodiment of the present invention, the receiving unit 1930 may receive an activation-related request message from a second BS, or may receive a UE measurement report from the UE and the like.

In addition, the receiving unit 1930 may execute all functions in association with the operations of the first BS that have been described with reference to FIGS. 5 to 17.

Subsequently, a second BS 1900 according to an embodiment of the present invention will be described.

A controller 1910 of the second BS may control general operations of the BS in association with transmitting activation-related indication information of a second BS-associated cell, which are required for implementing the present invention.

Also, a receiving unit 1930 of the second BS 1900 may receive an activation-related indication information transmission request message from a first BS (not shown).

Also, a transmitting unit 1920 of the second BS 1900 may transmit activation-related indication information to a UE (not shown), or may transmit second BS-associated cell activated state information of the UE to the first BS.

In addition, the receiving unit 1930 may execute all functions in association with the operations of the second BS 1900 that have been described with reference to FIGS. 5 to 17.

As described above, according to the present invention in an environment where a non-ideal backhaul is established between a first BS and a second BS and under a control of a macrocell, a second BS-associated cell is added as a serving cell for transmission of user data traffic. Subsequently, the second BS-associated cell may be activated/deactivated based on user data traffic and the like. Also, by maintaining an SCell, which is configured using a predetermined cell associated with the second BS to be activated, the battery consumption of the UE may decrease or user data traffic is offloaded to a second BS-associated cell while executing data transmission without a delay caused by activation.

That is, when the present invention is applied, there is provided a method and system for the UE to add a second BS-associated cell as a secondary cell, and to activate or deactivate the added second BS-associated cell.

Also, the present invention provides a method and system for a first BS that provides a macro cell or a second BS that provides a small cell to control activation or deactivation of a small cell added for a UE, and thus, the power consumption of the UE may decrease and a method and system for turning on/off a small cell, which is appropriate for data traffic may be provided.

Although a preferred embodiment of the present invention has been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiments. The scope of the present invention shall be construed on the basis of the accompanying claims in such a manner that all of the technical ideas included within the scope equivalent to the claims belong to the present invention.

The invention claimed is:

1. A method for activating or deactivating, by a user equipment, a cell associated with a second base station, the method comprising:
   receiving, by the user equipment, a higher layer signaling through a first base station after signaling between the first base station and the second base station, wherein the higher layer signaling includes information on a cell configuration associated with the second base station;
   configuring a cell associated with the second base station to be in an active state, based on the received higher layer signaling;
   configuring a radio bearer through the second base station; and
   controlling, by the user equipment, a cell activation or a cell deactivation,
   wherein the first base station is a macrocell base station and the second base station is a small cell base station;
   wherein the information on the cell configuration associated with the second base station comprises second base station-associated cell addition/modification configuration information that includes one of cell activation or deactivation indication information of a cell associated with the second base station and cell information associated with a cell that is to be maintained in an active state; and
   wherein the controlling includes:
   receiving, from the second base station, activation-related indication information including information for instructing to activate or deactivate a cell different than the configured cell among cells associated with the second base station; and
   controlling activation or deactivation of the different cell based on the received activation-related indication information.

2. The method as claimed in claim 1, wherein:
the activation-related indication information is included in a Media Access Control (MAC) signaling; and
the MAC signaling includes at least one of a MAC control element and a MAC header, and the MAC control element and the MAC header include a field indicating whether to activate the different cell.

3. The method as claimed in claim 1, wherein the signaling between the first base station and the second base station comprises:
configuring cell index information by distinguishing a cell associated with the first base station from a cell associated with the second base station.

4. The method as claimed in claim 1, wherein the configuring a cell associated with the second base station comprises configuring at least one of the cells associated with the second base station to be in an active state.

5. A method for activating or deactivating, by a first base station, a cell associated with a second base station, the method comprising:
transmitting, by the first base station, a higher layer signaling to a user equipment after signaling between the first base station and the second base station, wherein (i) the higher layer signaling includes information on a cell configuration associated with the second base station and second base station radio bearer addition/modification configuration information, and (ii) the user equipment configures at least one cell associated with the second base station to be in an active state, based on the higher layer signaling received through the first base station; and
receiving activated or deactivated state information of a cell associated with the second base station,
wherein the first base station is a macrocell base station and the second base station is a small cell base station;
wherein the information on the cell configuration associated with the second base station comprises second base station-associated cell addition/modification configuration information that includes one of cell activation or deactivation indication information of a cell associated with the second base station and cell information associated with a cell that is to be maintained in an active state; and
wherein activation-related indication information is transmitted from the second base station to the user equipment such that the user equipment controls a cell activation or a cell deactivation based on the activation-related indication information, wherein the activation-related indication information includes information for instructing to activate or deactivate a cell different than the configured cell among cells associated with the second base station.

6. The method as claimed in claim 5, wherein the signaling between the first base station and the second base station comprises configuring cell index information by distinguishing a cell associated with the first base station from a cell associated with the second base station.

7. A method for activating or deactivating, by a second base station, a cell associated with the second base station, the method comprising:
generating a higher layer signaling for transmitting to a user equipment by a first base station in a signaling process between the first base station and a second base station, wherein (i) the higher layer signaling includes information on a cell configuration associated with the second base station, where the information on the cell configuration associated with the second base station comprises second base station-associated cell addition/modification configuration information that includes one of cell activation or deactivation indication information of a cell associated with the second base station and cell information associated with a cell that is to be maintained in an active state, and (ii) the higher layer signaling is transmitted to the user equipment through the first base station such that the user equipment configures at least one cell associated with the second base station to be in an active state based on the higher layer signaling;
transmitting, by the second base station to the user equipment, activation-related indication information such that the user equipment controls a cell activation or a cell deactivation based on the activation-related indication information, wherein the activation-related indication information includes information for instructing to activate or deactivate a cell that is different than a cell configured to be activated from among cells associated with the second base station; and
transmitting to the first base station activated or deactivated state information of the different cell associated with the second base station,
wherein the first base station is a macrocell base station and the second base station is a small cell base station.

8. The method as claimed in claim 7, wherein signaling between the first base station and the second base station configures cell index information by distinguishing a cell associated with the first base station from a cell associated with the second base station.

9. The method as claimed in claim 7, wherein:
the activation-related indication information is included in a Media Access Control (MAC) signaling; and
the MAC signaling includes at least one of a MAC control element and a MAC header, and the MAC control element and the MAC header include a field indicating whether to activate the different cell.

* * * * *